(12) United States Patent
Yamada et al.

(10) Patent No.: US 10,107,574 B2
(45) Date of Patent: Oct. 23, 2018

(54) HEAT EXCHANGER INCLUDING FINS WITH SURFACE HAVING BACTERICIDAL ACTIVITY, METALLIC MEMBER WITH SURFACE HAVING BACTERICIDAL ACTIVITY, METHOD FOR INHIBITING MOLD GROWTH AND STERILIZATION METHOD BOTH USING SURFACE OF FINS OF HEAT EXCHANGER OR SURFACE OF METALLIC MEMBER, AND ELECTRICAL WATER BOILER, BEVERAGE SUPPLIER, AND LUNCH BOX LID ALL INCLUDING METALLIC MEMBER

(71) Applicant: Sharp Kabushiki Kaisha, Sakai, Osaka (JP)

(72) Inventors: Miho Yamada, Sakai (JP); Kiyoshi Minoura, Sakai (JP); Takahiro Nakahara, Sakai (JP); Kouji Kusumoto, Sakai (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 15/502,046

(22) PCT Filed: Jul. 10, 2015

(86) PCT No.: PCT/JP2015/069885
§ 371 (c)(1),
(2) Date: Feb. 6, 2017

(87) PCT Pub. No.: WO2016/021367
PCT Pub. Date: Feb. 11, 2016

(65) Prior Publication Data
US 2017/0227305 A1    Aug. 10, 2017

(30) Foreign Application Priority Data

Aug. 7, 2014 (JP) .................. 2014-161834
Jun. 23, 2015 (JP) .................. 2015-125804

(51) Int. Cl.
*F28F 13/18* (2006.01)
*F28F 19/02* (2006.01)
(Continued)

(52) U.S. Cl.
CPC ........... *F28F 19/02* (2013.01); *A47J 31/4403* (2013.01); *C25D 11/12* (2013.01); *C25D 11/24* (2013.01); *B65D 81/24* (2013.01); *F28F 2265/20* (2013.01)

(58) Field of Classification Search
CPC ....... F28F 19/02; F28F 2265/20; A61L 2/235; C25D 5/02; C25D 5/44; C25D 11/12; C25D 11/24; A47J 31/4403; B65D 81/24
(Continued)

(56) References Cited

U.S. PATENT DOCUMENTS

2003/0205475 A1    11/2003  Sawitowski
2007/0159698 A1     7/2007  Taguchi et al.
(Continued)

FOREIGN PATENT DOCUMENTS

JP    05339743 A    12/1993
JP    09071897 A     3/1997
(Continued)

OTHER PUBLICATIONS

Ivanova et al., "Bactericidal activity of black silicon," Nov. 26, 2013, Nature Communications, 4:2838, DOI: 10.1038/ncomms3838.
(Continued)

*Primary Examiner* — Davis Hwu
(74) *Attorney, Agent, or Firm* — Harness, Dickey & Pierce, P.L.C.

(57) ABSTRACT

A heat exchanger includes a fin, the fin including a metal base and a porous anodized layer formed on the metal base. A surface of the porous anodized layer has a submicron-order uneven structure, the uneven structure including a
(Continued)

plurality of recessed portions whose two-dimensional size viewed in a normal direction of the surface is more than 100 nm and less than 500 nm.

14 Claims, 15 Drawing Sheets

(51) Int. Cl.
    *A47J 31/44*     (2006.01)
    *C25D 11/24*     (2006.01)
    *C25D 11/12*     (2006.01)
    *B65D 81/24*     (2006.01)

(58) Field of Classification Search
    USPC .......................................................... 165/133
    See application file for complete search history.

(56) References Cited

U.S. PATENT DOCUMENTS

| | | | |
|---|---|---|---|
| 2008/0164013 A1* | 7/2008 | Maziers | F28F 1/32 165/151 |
| 2012/0318772 A1 | 12/2012 | Minoura et al. | |
| 2013/0063725 A1 | 3/2013 | Hayashi et al. | |
| 2014/0367263 A1* | 12/2014 | Fukui | C25D 11/20 205/50 |
| 2015/0140154 A1 | 5/2015 | Isurugi et al. | |
| 2015/0299888 A1 | 10/2015 | Onomoto et al. | |
| 2016/0212989 A1 | 7/2016 | Juodkazis et al. | |

FOREIGN PATENT DOCUMENTS

| | | |
|---|---|---|
| JP | 10033375 A | 2/1998 |
| JP | 10033375 A | 10/1998 |
| JP | 11043667 A | 2/1999 |
| JP | 3114470 U | 10/2005 |
| JP | 2007040686 A | 2/2007 |
| JP | 2009014304 A | 1/2009 |
| JP | 4265729 B2 | 5/2009 |
| JP | 2009-166502 A | 7/2009 |
| JP | 2010175131 A | 8/2010 |
| JP | 05339743 B2 | 11/2013 |
| JP | 2014029249 A | 2/2014 |
| TW | 201026895 A | 7/2010 |
| WO | WO-2011125486 A1 | 10/2011 |
| WO | WO-2011145625 A1 | 11/2011 |
| WO | WO-2013183576 A1 | 12/2013 |
| WO | WO-2014092048 A1 | 6/2014 |

OTHER PUBLICATIONS

Kure et al., "Formation of self-organized nanoporous anodic films on Type 304 stainless steel," May 3, 2012, Electrochemistry Communications, 21, pp. 1-4.

Ivanova et al., "Natural Bactericidal Surfaces: Mechanical Rupture of Pseudomonas aeruginosa Cells by Cicada Wings," 2012, Small, DOI: 10.1002/smll.201200528, pp. 1-6.

International Search Report PCT/ISA/210 for International Application No. PCT/JP2015/069885 dated Sep. 15, 2015.

* cited by examiner (a)

(b)

(a)

(b)

(a)

(b) (c)

(a)

(b)

(c)

(a)

(b)

(a)

(b)

HEAT EXCHANGER INCLUDING FINS WITH SURFACE HAVING BACTERICIDAL ACTIVITY, METALLIC MEMBER WITH SURFACE HAVING BACTERICIDAL ACTIVITY, METHOD FOR INHIBITING MOLD GROWTH AND STERILIZATION METHOD BOTH USING SURFACE OF FINS OF HEAT EXCHANGER OR SURFACE OF METALLIC MEMBER, AND ELECTRICAL WATER BOILER, BEVERAGE SUPPLIER, AND LUNCH BOX LID ALL INCLUDING METALLIC MEMBER

TECHNICAL FIELD

The present invention relates to a heat exchanger having a fin whose surface has a microbicidal activity, a metal member whose surface has a microbicidal activity, a method for preventing occurrence of fungi and a sterilization method with the use of the surface of the fin of the heat exchanger or the surface of the metal member, and an electric water heater, a beverage dispenser, and a lid of a food container (bento box) which have the metal member.

BACKGROUND ART

Recently, it was reported that surficial nanostructures of black silicon, wings of cicadas and dragonflies have a bactericidal activity (Non-patent Document 1). For example, reportedly, black silicon has 500 nm high nanopillars, and the physical structure of the nanopillars produces a bactericidal activity. Wings of cicadas and dragonflies have 240 nm high nanopillars.

According to Non-patent Document 1, black silicon has the strongest bactericidal activity on Gram-negative bacteria, while wings of dragonflies have a weaker bactericidal activity, and wings of cicadas have a still weaker bactericidal activity. The static contact angle (hereinafter, sometimes simply referred to as "contact angle") of the black silicon surface with respect to water is 80°, while the contact angles of the surface of wings of dragonflies and cicadas with respect to water are 153° and 159°, respectively.

CITATION LIST

Patent Literature

Patent Document 1: Japanese Patent No. 4265729
Patent Document 2: Japanese Laid-Open Patent Publication No. 2009-166502
Patent Document 3: WO 2011/125486
Patent Document 4: WO 2013/183576
Patent Document 5: Japanese Laid-Open Patent Publication No. 2010-175131

Non-Patent Literature

Non-patent Document 1: Ivanova, E. P. et al., "Bactericidal activity of black silicon", Nat. Commun. 4:2838 doi: 10.1038/ncomms3838 (2013).

SUMMARY OF INVENTION

Technical Problem

The mechanism of killing bacteria by nanopillars is not clear from the results described in Non-patent Document 1. It is also not clear whether the reason why black silicon has a stronger bactericidal activity than wings of dragonflies and cicadas resides in the difference in height or shape of nanopillars or the difference in surface free energy (which can be evaluated by the contact angle). It is also not clear whether or not the bactericidal activity changes depending on a substance which has nanopillars (black silicon and other substances (e.g., metals)).

The bactericidal activity of black silicon is difficult to utilize because black silicon is poor in mass productivity, and is hard but brittle so that the shapability is poor.

The present invention was conceived for the purpose of solving the above problems. The major objects of the present invention include providing a heat exchanger having a fin whose surface has a microbicidal activity, a metal member whose surface has a microbicidal activity, a method for suppressing occurrence of fungi and a sterilization method with the use of the surface of the fin of the heat exchanger or the surface of the metal member, and an electric water heater, a beverage dispenser, and a lid of a food container which have the metal member.

Solution to Problem

A heat exchanger of an embodiment of the present invention includes a fin, the fin including a metal base and a porous anodized layer formed on the metal base, wherein a surface of the porous anodized layer has a submicron-order uneven structure, the uneven structure including a plurality of recessed portions whose two-dimensional size viewed in a normal direction of the surface is more than 100 nm and less than 500 nm.

In one embodiment, the uneven structure includes a protruding portion formed between adjoining ones of the plurality of recessed portions.

In one embodiment, the protruding portion includes a ridge formed at an intersection of lateral surfaces of adjoining ones of the plurality of recessed portions.

In one embodiment, an adjoining distance of the plurality of recessed portions is greater than the two-dimensional size of the plurality of recessed portions.

In one embodiment, the lateral surfaces of the plurality of recessed portions are inclined with respect to a normal direction of the surface.

In one embodiment, at least part of the lateral surfaces of the plurality of recessed portions is stepped.

In one embodiment, a static contact angle of the surface with respect to hexadecane is not more than 110.4°.

In one embodiment, a static contact angle of the surface with respect to hexadecane is not more than 29.3°.

In one embodiment, the surface is treated with a surface treatment agent.

In one embodiment, the surface treatment agent contains an amino group.

In one embodiment, an adjoining distance of the plurality of recessed portions is more than 20 nm and less than 500 nm.

In one embodiment, the two-dimensional size of the plurality of recessed portions is not less than 140 nm.

In one embodiment, the metal base is a valve metal.

In one embodiment, the porous anodized layer is formed by anodizing a valve metal.

A metal member of an embodiment of the present invention includes a metal base and a porous anodized layer formed on the metal base, wherein a surface of the porous anodized layer has a submicron-order uneven structure, the surface having a microbicidal effect.

In one embodiment, the uneven structure includes a plurality of recessed portions whose two-dimensional size viewed in a normal direction of the surface is more than 100 nm and less than 500 nm.

In one embodiment, a static contact angle of the surface with respect to hexadecane is not more than 110.4°.

In one embodiment, a static contact angle of the surface with respect to hexadecane is not more than 29.3°.

In one embodiment, the surface is treated with a surface treatment agent.

A method for preventing occurrence of fungi according to an embodiment of the present invention includes bringing steam into contact with the surface of the fin of any of the above-described heat exchangers.

A method for sterilizing a gas or liquid according to an embodiment of the present invention includes bringing the gas or liquid into contact with the surface of the fin of any of the above-described heat exchangers.

A method for preventing occurrence of fungi according to another embodiment of the present invention includes bringing steam into contact with the surface of any of the above-described metal members.

A method for sterilizing a gas or liquid according to another embodiment of the present invention includes bringing the gas or liquid into contact with the surface of any of the above-described metal members.

An electric water heater of an embodiment of the present invention includes: a tank for containing drinkable water and heating the contained drinkable water; a spout through which the heated drinkable water is discharged; and a water elevating pipe provided between the tank and the spout, wherein the water elevating pipe includes a metal base and a porous anodized layer formed on the metal base at an inside of the pipe, a surface of the porous anodized layer having a submicron-order uneven structure, the uneven structure including a plurality of recessed portions whose two-dimensional size viewed in a normal direction of the surface is more than 100 nm and less than 500 nm. The electric water heater is, for example, an electric kettle.

A beverage dispenser according to an embodiment of the present invention includes: a tank for containing drinkable water and heating the contained drinkable water; a spout through which a beverage including the heated drinkable water is discharged; and a water supply pipe provided between the tank and the spout, wherein the water supply pipe includes a metal base and a porous anodized layer formed on the metal base at an inside of the pipe, a surface of the porous anodized layer having a submicron-order uneven structure, the uneven structure including a plurality of recessed portions whose two-dimensional size viewed in a normal direction of the surface is more than 100 nm and less than 500 nm. The beverage dispenser is, for example, a coffee maker.

A food container lid according to an embodiment of the present invention includes a metal base and a porous anodized layer formed on the metal base, wherein a surface of the porous anodized layer has a submicron-order uneven structure, the uneven structure including a plurality of recessed portions whose two-dimensional size viewed in a normal direction of the surface is more than 100 nm and less than 500 nm.

Advantageous Effects of Invention

According to an embodiment of the present invention, a heat exchanger having a fin whose surface has a microbicidal activity, a metal member whose surface has a microbicidal activity, a method for preventing occurrence of fungi and a sterilization method with the use of the surface of the fin of the heat exchanger or the surface of the metal member, and an electric water heater, a beverage dispenser, and a lid of a food container which have the metal member are provided.

DESCRIPTION OF EMBODIMENTS

Figure 1:
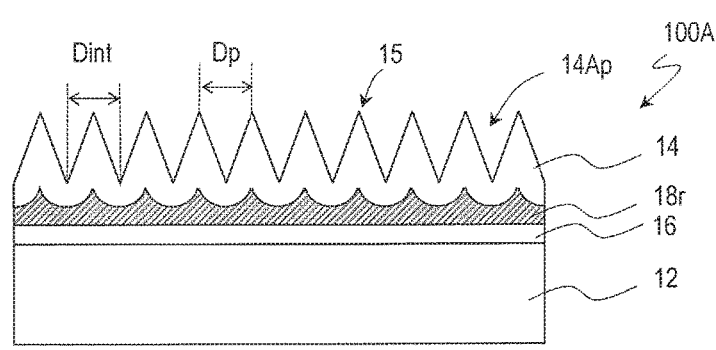
FIG. 1 (*a*) is a schematic cross-sectional view of a metal member 100A of an embodiment of the present invention. (*b*) is a schematic cross-sectional view of a metal member 100B of another embodiment of the present invention.
Figure 1:
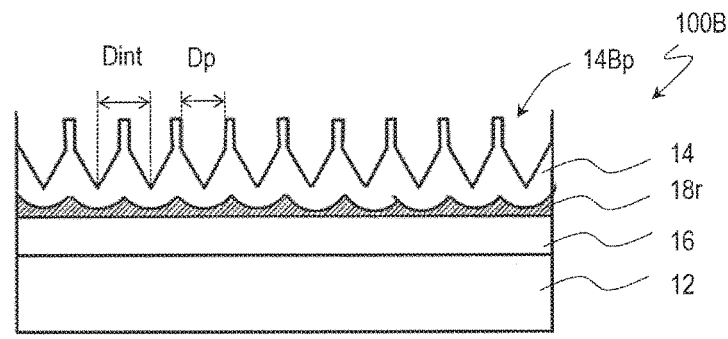

Hereinafter, a metal member and a heat exchanger of embodiments of the present invention are described with reference to the drawings. Note that the present invention is not limited to the embodiments which will be described in the following sections. In the drawings mentioned in the following sections, components which have substantially the same functions are denoted by the same reference numerals, and the descriptions thereof are sometimes omitted.

In this specification, the following terms are used.

"Sterilization" (or "microbicidal") means reducing the number of proliferative microorganisms contained in an object, such as solid or liquid, or a limited space, by an effective number.

"Microorganism" includes viruses, bacteria, and fungi.

"Antimicrobial" generally includes suppressing and preventing multiplication of microorganisms and includes suppressing dinginess and slime which are attributed to microorganisms.

The present applicant conceived a method in which an anodized porous alumina layer whose surface has an inverted moth-eye structure is used for the purpose of producing an antireflection film (an antireflection surface) which has a moth-eye structure (e.g., Patent Documents 1 to 4). The entire disclosures of Patent Documents 1 to 4 are incorporated by reference in this specification.

The present inventors developed the above-described technology and arrived at the concept of a metal member whose surface has a microbicidal activity and a heat exchanger having a fin whose surface has a microbicidal activity.

Figure 2:
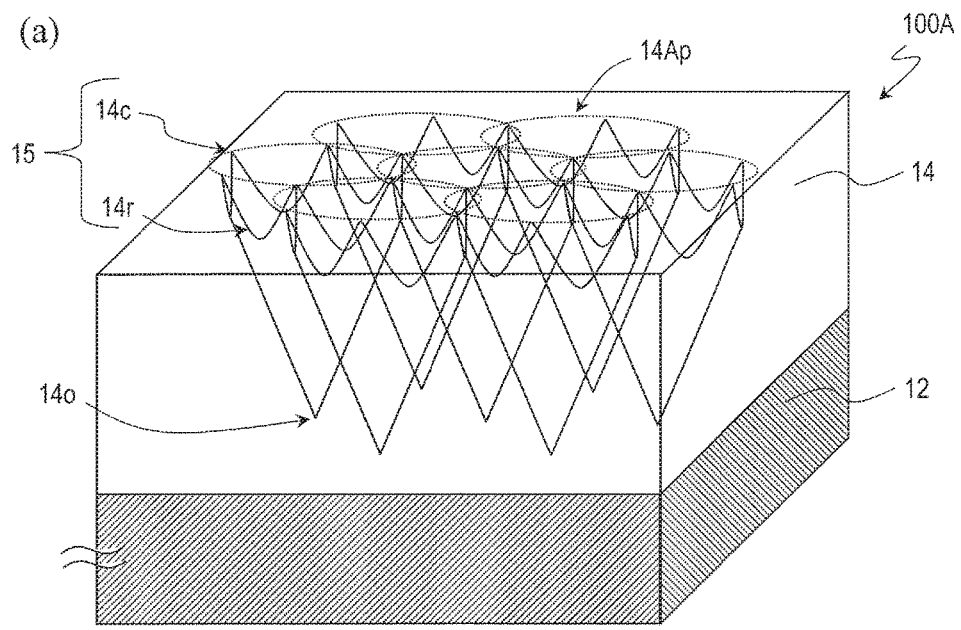
FIG. 2 (*a*) is an example of a schematic perspective view of the metal member 100A. (*b*) is an example of a schematic plan view of the metal member 100A.
Figure 2:
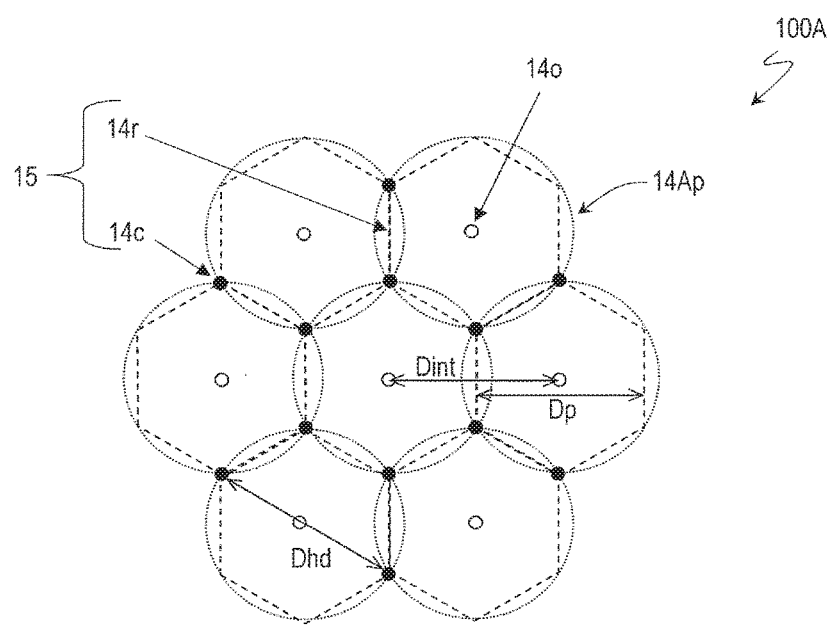
Figure 3:
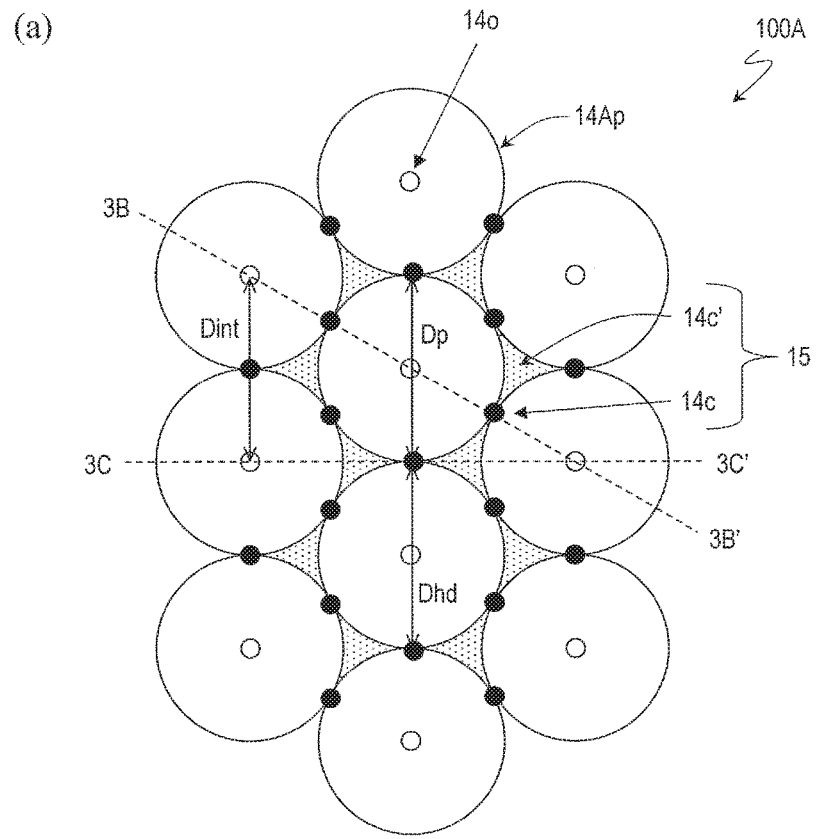
FIG. 3 (*a*) is an example of a schematic plan view of the metal member 100A. (*b*) is an example of a schematic cross-sectional view of the metal member 100A taken along line 3B-3B' of (*a*). (*c*) is an example of a schematic cross-sectional view of the metal member 100A taken along line 3C-3C' of (*a*).
Figure 3:
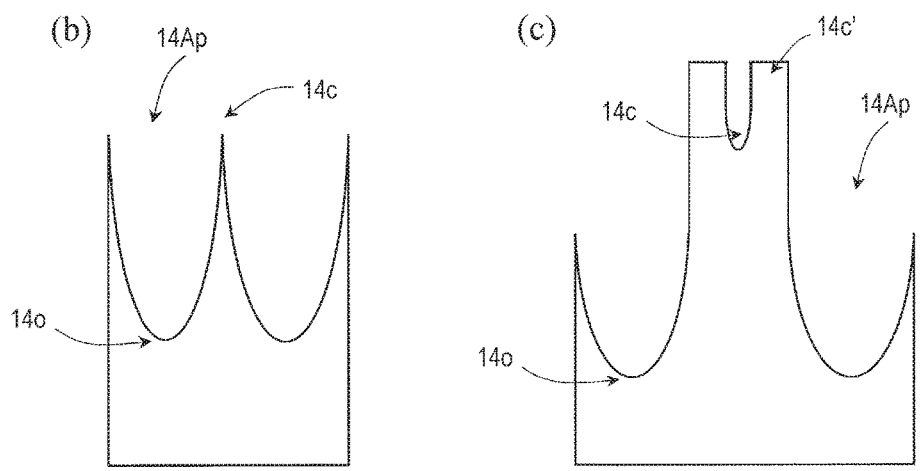

The configuration of the metal member of an embodiment of the present invention is described with reference to FIG. 1, FIG. 2 and FIG. 3. FIG. 1(a) is a schematic cross-sectional view of a metal member 100A of an embodiment of the present invention. FIG. 1(b) is a schematic cross-sectional view of a metal member 100B of another embodiment of the present invention. FIG. 2(a) and FIG. 2(b) are an example of a schematic perspective view and an example of a schematic plan view, respectively, of the metal member 100A. FIG. 3(a) is an example of a schematic plan view of the metal member 100A. FIG. 3(b) is an example of a schematic cross-sectional view of the metal member 100A taken along line 3B-3B' of FIG. 3(a). FIG. 3(c) is an example of a schematic cross-sectional view of the metal member 100A taken along line 3C-3C' of FIG. 3(a).

As shown in FIG. 1(a), the metal member 100A includes a metal base 12 and a porous anodized layer 14 formed on the metal base 12. A surface of the porous anodized layer 14 has a submicron-order uneven structure. The surface of the porous anodized layer 14 has a microbicidal effect. The microbicidal effect of the metal member of the embodiment of the present invention will be described later with experimental examples.

The uneven structure of the surface of the porous anodized layer 14 includes, for example, a plurality of recessed portions 14Ap. When the recessed portions 14Ap are densely arranged so that there is no gap between adjoining recessed portions 14Ap (e.g., the bases of the cones partially overlap each other as illustrated in FIG. 2(a) and FIG. 2(b)) as shown in FIG. 1(a), the two-dimensional size of the recessed portions 14Ap, Dp, is equal to the adjoining distance of the recessed portions 14Ap, Dint. Here, the "two-dimensional size" of the recessed portions 14Ap refers to the diameter of a circle equivalent to the area of the recessed portions 14Ap when viewed in a normal direction of the surface. When the recessed portions 14Ap have a conical shape, for example, the two-dimensional size of the recessed portions 14Ap is equivalent to the diameter of the base of the cone. The two-dimensional size of the recessed portions 14Ap, Dp, is for example more than 100 nm and less than 500 nm. The adjoining distance of the recessed portions 14Ap, Dint, is for example more than 20 nm and less than 500 nm. The typical depth of the recessed portions 14Ap is not less than 50 nm and less than 1000 nm.

The metal member 100A may further include an inorganic material layer 16 formed on the metal base 12. The metal member 100A may further include a metal remnant layer 18r under the porous anodized layer 14.

As illustrated in FIG. 2(a) and FIG. 2(b), when the recessed portions 14Ap have a conical shape, the bases of the cones may partially overlap each other. A ridge 14r can be formed between adjoining recessed portions 14Ap. The ridge 14r is formed, for example, at the intersection of adjoining recessed portions 14Ap. For example, when the recessed portions 14Ap have a conical shape, a ridge 14r can be formed at the intersection of the lateral surfaces of the cones. As illustrated in FIG. 2(b), when viewed in the normal direction of the surface of the porous anodized layer 14, if the centers 14o of the recessed portions 14Ap are in an equilateral triangular lattice arrangement, ridges 14r are formed in an equilateral hexagon arrangement whose center is at the center 14o. Further, acute protrusions 14c can be formed at the positions corresponding to the vertexes of the hexagon. A portion including the ridges 14r and the acute protrusions 14c is herein referred to as "protruding portion 15". The projection of the acute protrusions 14c is greater than that of the ridges 14r and, therefore, the tip end of the protruding portion 15 can consist of a plurality of points (e.g., acute protrusions 14c). The tip end of the protruding portion 15 refers to, for example, a distal end in the normal direction of the surface of the porous anodized layer 14. It is estimated that the metal member 100A has a microbicidal activity due to the protruding portions 15 on the surface.

A circle represented by a dotted line in FIG. 2(a) and FIG. 2(b) is a circle whose center is coincident with the center 14o of the recessed portions 14Ap and which passes through the acute protrusions 14c formed at the positions corresponding to the vertexes of the equilateral hexagon. The diameter of this circle is also referred to as "virtual diameter Dhd" of the recessed portions 14Ap. In the example illustrated in FIG. 2(a) and FIG. 2(b), the virtual diameter Dhd of the recessed portions 14Ap is greater than the adjoining distance Dint and the two-dimensional size Dp (Dhd>Dint=Dp).

As illustrated in FIG. 3(a), when the recessed portions 14Ap have a conical shape, the bases of the cones do not need to overlap each other. As illustrated in FIG. 3(a), the circles of the bases of the cones may be in contact with each other. In this case, a ridge 14r may not be formed between adjoining recessed portions 14Ap. As illustrated in FIG. 3(a), when viewed in the normal direction of the surface of the porous anodized layer 14, if the centers 14o of the recessed portions 14Ap are in, for example, an equilateral triangular lattice arrangement, the protruding portions 15 include points 14c corresponding to the vertexes of the equilateral hexagon whose center is coincident with the center 14o and protrusion regions 14c' surrounded by the points 14c. The protrusion regions 14c' are, for example, regions which do not constitute the recessed portions 14Ap when viewed in the normal direction of the surface.

As shown in FIG. 3(b), in the cross section taken along line 3B-3B' of FIG. 3(a), the points 14c are the acute protrusions 14c formed between adjoining recessed portions 14Ap. As shown in FIG. 3(c), in the cross section taken along line 3C-3C' of FIG. 3(a), the projection of the protrusion regions 14c' can be greater than that of the points 14c. In this case, the tip end of the protruding portion 15 consists of, for example, a plurality of regions (e.g., protrusion regions 14c') rather than points. The tip end of the protruding portion 15 can have, for example, the same two-dimensional size as that of the protrusion regions 14c'. The two-dimensional size of the protrusion region 14c' refers to the diameter of a circle equivalent to the area of the protrusion region 14c' when viewed in a normal direction of the surface. Since the protrusion regions 14c' are formed between submicron-order recessed portions 14Ap, the two-dimensional size of the tip end of the protruding portion 15 can be not more than the order of several hundreds of nanometers. Thus, the protruding portion 15 can have a microbicidal ability.

In the example illustrated in FIGS. 3(a) to 3(c), the virtual diameter Dhd of the recessed portions 14Ap is equal to the adjoining distance Dint and the two-dimensional size Dp (Dhd=Dint=Dp). From such a viewpoint that the physical structure of the surface has an excellent microbicidal activity, it is estimated that the virtual diameter Dhd of the recessed portions 14Ap is preferably greater than the adjoining distance Dint and the two-dimensional size Dp (Dhd>Dint=Dp) as illustrated in FIG. 2(a) and FIG. 2(b). This is because the protruding portion 15 has the acute protrusion 14c, and the tip end of the protruding portion can consist of points. Note that, however, it is estimated that not only the physical structure of the surface but also the chemical properties (e.g., lipophilicity) of the surface contribute to the microbicidal activity of the metal member. That is, as will be described later with experimental examples, the surface of the porous anodized layer 14 may be provided with a surface treatment agent. The surface treatment agent includes, for example, a mold releasing agent, a silane coupling agent, a hydrophilic paint, an anticorrosion agent, and the like. By application of the surface treatment agent to the surface, the hydrophilicity and/or lipophilicity of the surface of the metal member can be modified. For example, the static contact angle of the surface of the porous anodized layer 14 with respect to hexadecane may be not more than 110.4° and moreover may be not more than 29.3°. The surface of the porous anodized layer 14 may be provided with an antibacterial paint. By application of the antibacterial paint to the surface, the microbicidal activity can be further improved.

The arrangement of the recessed portions 14Ap is not limited to those illustrated in FIG. 2 and FIG. 3, but may be a regular arrangement or may be an irregular (random) arrangement.

Next, a metal member 100B of another embodiment of the present invention is described with reference to FIG. 1(b). The metal member 100B shown in FIG. 1(b) is different from the metal member 100A in that the uneven structure of the surface of the porous anodized layer 14 includes a plurality of recessed portions 14Bp. The metal member 100B may be the same as the metal member 100A except for the plurality of recessed portions 14Bp.

As shown in FIG. 1(b), the adjoining distance Dint of the recessed portions 14Bp is greater than the two-dimensional size Dp of the recessed portions 14Bp (Dint>Dp). The virtual diameter Dhd of the recessed portions 14Bp is equal to the two-dimensional size Dp of the recessed portions 14Bp (Dp=Dhd). In this case, adjoining recessed portions 14Bp do not intersect, so that a ridge 14r is not formed between the adjoining recessed portions 14Bp. The tip end in the normal direction of the surface of the porous anodized layer 14 forms, for example, a plane over which the plurality of recessed portions 14Bp are distributed. In order that the metal member 100B has a microbicidal ability, for example, as for the relationship between the two-dimensional size Dp of the recessed portions 14Bp and the adjoining distance Dint of the recessed portions 14Bp, (Dint−Dp)/Dint is preferably not more than 0.9 (i.e., Dp/Dint is preferably not less than 0.1). In order that the metal member 100B has a microbicidal ability, for example, the surface of the porous anodized layer 14 is preferably provided with a surface treatment. For example, the static contact angle of the surface of the porous anodized layer 14 with respect to hexadecane is not more than 110.4°. More preferably, the static contact angle of the surface of the porous anodized layer 14 with respect to hexadecane may be not more than 29.3°.

For a manufacturing method of the metal members 100A and 100B according to an embodiment of the present invention, for example, as will be described in the following section, the manufacturing methods of a mold for production of an antireflection film disclosed in Patent Documents 2 to 4 can be cited. This enables to accurately control the size and depth of the recessed portions. Also, the recessed portions can be uniformly arranged. Note that, however, to use the microbicidal activity of the surface, high uniformity such as that required in the antireflection film is not required and, therefore, the manufacturing method of the mold can be simplified. For example, as are metal members 100A' and 100B' which will be described later with reference to FIG. 6, a surface of a metal base (e.g., made of a valve metal) may be directly anodized in manufacture.

A manufacturing method of the metal member 100A is described with reference to FIG. 4(a) to FIG. 4(e).

Figure 4:
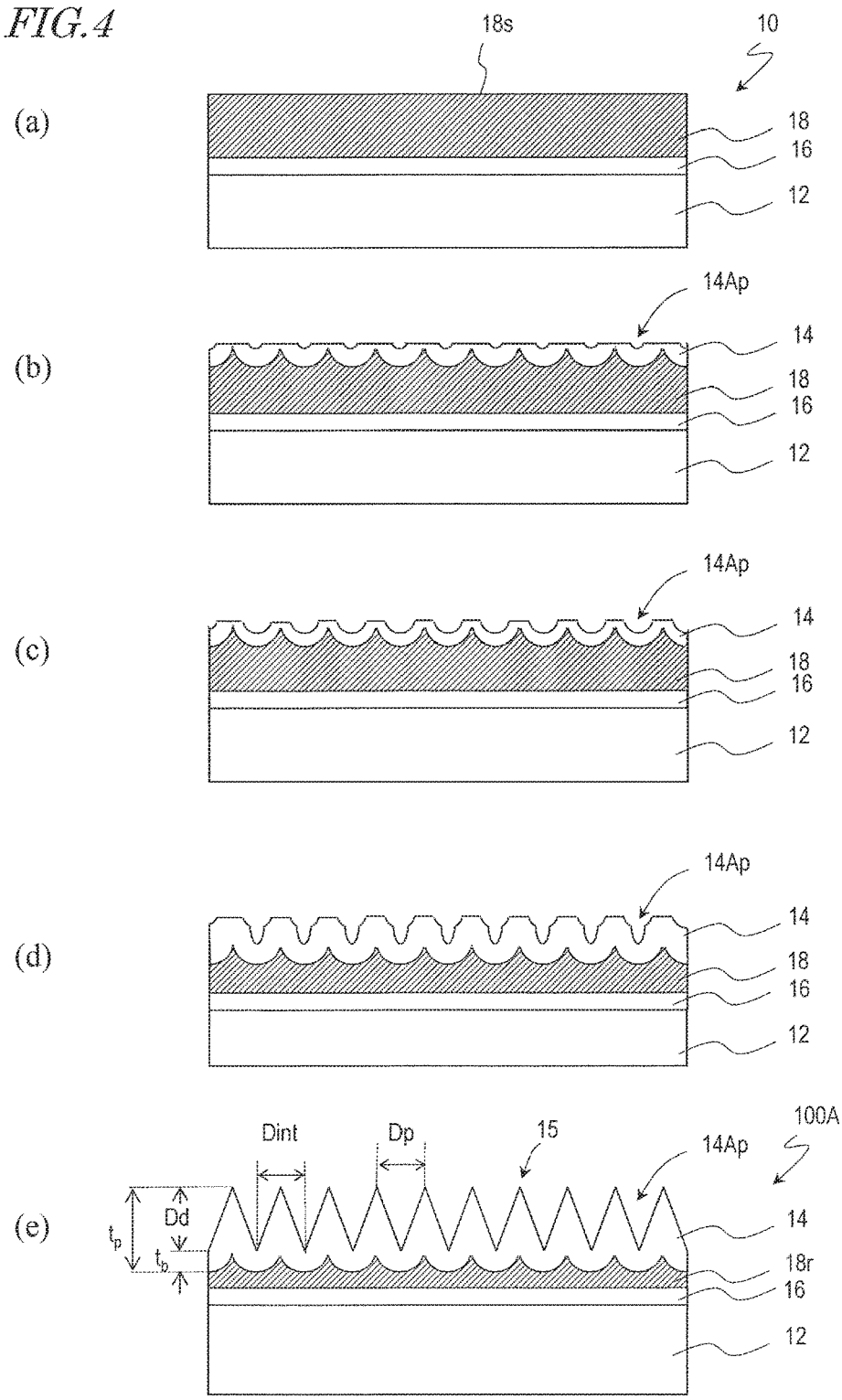
FIG. 4 (*a*) to (*e*) are diagrams for illustrating a manufacturing method of the metal member 100A and the configuration of the metal member 100A.

First, as shown in FIG. 4(a), a mold base 10 is provided which includes a metal base 12, an inorganic material layer 16 formed on a surface of the metal base 12, and a metal film 18 deposited on the inorganic material layer 16.

The metal base 12 is, for example, an aluminum base. The metal film 18 is, for example, an aluminum film. Hereinafter, examples of the aluminum base 12 and the aluminum film 18 are described. However, the metal member of the embodiment of the present invention is not limited to these examples. The metal base 12 and the metal film 18 are each made of a valve metal. The "valve metal" is a generic term for metals that are to be anodized. Examples of the valve metal other than aluminum include tantalum (Ta), niobium (Nb), molybdenum (Mo), titanium (Ti), hafnium (Hf), zirconium (Zr), zinc (Zn), tungsten (W), bismuth (Bi), and antimony (Sb). Anodization of the valve metal is performed by known methods. The conditions including the type of the electrolytic solution, the voltage, etc., can be appropriately selected and set according to respective metals. The etching solution for an anodized film can also be appropriately selected according to respective metals. For example, anodization of Ti can be carried out in an electrolytic solution such as, for example, a mixture aqueous solution of ethylene glycol and ammonium fluoride, an aqueous solution containing a sulfuric acid and/or a phosphoric acid, or the like. As the etching solution for Ti, for example, an aqueous solution containing an acid selected from the group consisting of a concentrated phosphoric acid, a hot concentrated sulfuric acid and a hot concentrated hydrochloric acid, or a hydrofluoric acid mixture aqueous solution (for example, including a hydrofluoric acid/nitric acid mixture aqueous solution, a hydrofluoric acid/hydrogen peroxide mixture aqueous solution, an ammonium fluoride/hydrofluoric acid mixture aqueous solution, and the like) can be used.

The metal base 12 and the metal film 18 each may be made of, for example, stainless steel. It is known that stainless steel is not a valve metal but forms a submicron-order self-organized structure when anodized. When type 304 stainless steel is used, an anodized film is formed which has submicron-order recessed portions as disclosed in, for example, K. Kure et al., "Formation of self-organized nanoporous anodic film on Type 304 stainless steel", Electrochemistry Communications 21 (2012) 1-4. The entire disclosure of this document is incorporated by reference in this specification. Note that the etching solution used for stainless steel can be, for example, aqua regia (a liquid composed of concentrated hydrochloric acid and concentrated nitric acid in a volume proportion of 3:1).

The metal base 12 and the metal film 18 each may contain a metal which is known to have a high antibacterial effect (for example, gold (Au), silver (Ag), platinum (Pt) or copper (Cu)). The metal base 12 and the metal film 18 may be made of the same metal. For example, when the metal film 18 is made of titanium, the porous anodized layer 14 is made of titanium oxide. Titanium oxide is photocatalytically active and, therefore, the metal member can also have a microbicidal activity due to photocatalysis when irradiated with light.

The aluminum base 12 used may be an aluminum base whose aluminum purity is not less than 99.50 mass % and less than 99.99 mass % and which has relatively high rigidity. The impurity contained in the aluminum base 12 may preferably include at least one element selected from the group consisting of iron (Fe), silicon (Si), copper (Cu), manganese (Mn), zinc (Zn), nickel (Ni), titanium (Ti), lead (Pb), tin (Sn) and magnesium (Mg). Particularly, Mg is preferred. Since the mechanism of formation of pits (hollows) in the etching step is a local cell reaction, the aluminum base 12 ideally does not contain any element which is nobler than aluminum. It is preferred that the aluminum base 12 used contains, as the impurity element, Mg (standard electrode potential: −2.36 V) which is a base metal. If the content of an element nobler than aluminum is 10 ppm or less, it can be said in terms of electrochemistry that the aluminum base 12 does not substantially contain the element. The Mg content is preferably 0.1 mass % or more of the whole. It is, more preferably, in the range of not more than about 3.0 mass %. If the Mg content is less than 0.1 mass %, sufficient rigidity cannot be obtained. On the other hand, as the Mg content increases, segregation of Mg is more likely to occur. Even if the segregation occurs near a surface over which a moth-eye mold is to be formed, it would not be detrimental in terms of electrochemistry but would be a cause of a defect because Mg forms an anodized film of a different form from that of aluminum. The content of the impurity element may be appropriately determined depending on the shape, thickness, and size of the aluminum base 12, in view of required rigidity. For example, when the aluminum base 12 in the form of a plate is prepared by rolling, the appropriate Mg content is about 3.0 mass %. When the aluminum base 12 having a three-dimensional structure of, for example, a hollow cylinder is prepared by extrusion, the Mg content is preferably 2.0 mass % or less. If the Mg content exceeds 2.0 mass %, the extrudability deteriorates in general.

The aluminum base 12 used may be an aluminum pipe in the shape of a hollow cylinder which is made of, for example, JIS A1050, an Al—Mg based alloy (e.g., JIS A5052), or an Al—Mg—Si based alloy (e.g., JIS A6063).

The surface of the aluminum base 12 is preferably a surface cut with a bit. If, for example, abrasive particles are remaining on the surface of the aluminum base 12, conduction will readily occur between the aluminum film 18 and the aluminum base 12 in a portion in which the abrasive particles are present. Not only in the portion in which the abrasive particles are remaining but also in a portion which has a roughened surface, conduction readily occurs between the aluminum film 18 and the aluminum base 12. When conduction occurs locally between the aluminum film 18 and the aluminum base 12, there is a probability that a local cell reaction will occur between an impurity in the aluminum base 12 and the aluminum film 18.

The material of the inorganic material layer 16 may be, for example, tantalum oxide ($Ta_2O_5$) or silicon dioxide ($SiO_2$). The inorganic material layer 16 can be formed by, for example, sputtering. When a tantalum oxide layer is used as the inorganic material layer 16, the thickness of the tantalum oxide layer is, for example, 200 nm.

The thickness of the inorganic material layer 16 is preferably not less than 100 nm and less than 500 nm. If the thickness of the inorganic material layer 16 is less than 100 nm, there is a probability that a defect (typically, a void; i.e., a gap between crystal grains) occurs in the aluminum film 18. If the thickness of the inorganic material layer 16 is not less than 500 nm, insulation is likely to occur between the aluminum base 12 and the aluminum film 18 due to the surface condition of the aluminum base 12. To realize anodization of the aluminum film 18 by supplying an electric current from the aluminum base 12 side to the aluminum film 18, the electric current needs to flow between the aluminum base 12 and the aluminum film 18. When employing a configuration where an electric current is supplied from the inside surface of the aluminum base 12 in the shape of a hollow cylinder, it is not necessary to provide an electrode to the aluminum film 18. Therefore, the aluminum film 18 can be anodized across the entire surface, while such a problem does not occur that supply of the electric current becomes more difficult as the anodization advances. Thus, the aluminum film 18 can be anodized uniformly across the entire surface.

To form a thick inorganic material layer 16, it is in general necessary to increase the film formation duration. When the film formation duration is increased, the surface temperature of the aluminum base 12 unnecessarily increases, and as a result, the film quality of the aluminum film 18 deteriorates, and a defect (typically, a void) occurs in some cases. When the thickness of the inorganic material layer 16 is less than 500 nm, occurrence of such a problem can be suppressed.

The aluminum film 18 is, for example, a film which is made of aluminum whose purity is not less than 99.99 mass % (hereinafter, sometimes referred to as "high-purity aluminum film") as disclosed in Patent Document 3. The aluminum film 18 is formed by, for example, vacuum evaporation or sputtering. The thickness of the aluminum film 18 is preferably in the range of not less than about 500 nm and not more than about 1500 nm. For example, the thickness of the aluminum film 18 is about 1 μm.

The aluminum film 18 may be an aluminum alloy film disclosed in Patent Document 4 in substitution for the high-purity aluminum film. The aluminum alloy film disclosed in Patent Document 4 contains aluminum, a metal element other than aluminum, and nitrogen. In this specification, the "aluminum film" includes not only the high-purity aluminum film but also the aluminum alloy film disclosed in Patent Document 4.

Using the above-described aluminum alloy film enables to obtain a specular surface whose reflectance is not less than 80%. The average grain diameter of crystal grains that form the aluminum alloy film when viewed in the normal direction of the aluminum alloy film is, for example, not more than 100 nm, and that the maximum surface roughness Rmax of the aluminum alloy film is not more than 60 nm. The content of nitrogen in the aluminum alloy film is, for example, not less than 0.5 mass % and not more than 5.7 mass %. It is preferred that the absolute value of the difference between the standard electrode potential of the metal element other than aluminum which is contained in the aluminum alloy film and the standard electrode potential of aluminum is not more than 0.64 V, and that the content of the metal element in the aluminum alloy film is not less than 1.0 mass % and not more than 1.9 mass %. The metal element is, for example, Ti or Nd. The metal element is not limited to these examples but may be such a different metal element that the absolute value of the difference between the standard electrode potential of the metal element and the standard electrode potential of aluminum is not more than 0.64 V (for example, Mn, Mg, Zr, V, and Pb). Further, the metal element may be Mo, Nb, or Hf. The aluminum alloy film may contain two or more of these metal elements. The aluminum alloy film is formed by, for example, a DC magnetron sputtering method. The thickness of the aluminum alloy film is also preferably in the range of not less than about 500 nm and not more than about 1500 nm. For example, the thickness of the aluminum alloy film is about 1 μm.

Then, a surface 18s of the aluminum film 18 is anodized to form a porous anodized layer (porous alumina layer) 14 which has a plurality of recessed portions (micropores) 14Ap as shown in FIG. 4(b). The porous alumina layer 14 includes a porous layer which has the recessed portions 14Ap and a barrier layer (the base of the recessed portions (micropores) 14Ap). As known in the art, the interval between adjacent recessed portions 14Ap (the distance between the centers) is approximately twice the thickness of the barrier layer and is approximately proportional to the voltage that is applied during the anodization. This relationship also applies to the final porous alumina layer 14 shown in FIG. 4(e).

The porous alumina layer 14 is formed by, for example, anodizing the surface 18s in an acidic electrolytic solution. The electrolytic solution used in the step of forming the porous alumina layer 14 is, for example, an aqueous solution which contains an acid selected from the group consisting of oxalic acid, tartaric acid, phosphoric acid, sulfuric acid, chromic acid, citric acid, and malic acid. For example, the surface 18s of the aluminum film 18 is anodized with an applied voltage of 80 V for 55 seconds using an oxalic acid aqueous solution (concentration: 0.3 mass %, solution temperature: 10° C.), whereby the porous alumina layer 14 is formed.

Then, the porous alumina layer 14 is brought into contact with an alumina etchant such that a predetermined amount is etched away, whereby the opening of the recessed portions 14Ap is enlarged as shown in FIG. 4(c). By enlarging the opening of the recessed portions 14Ap, the two-dimensional size Dp of the recessed portions 14Ap increases. When the two-dimensional size Dp of the recessed portions 14Ap is equal to the adjoining distance Dint of the recessed portions 14Ap, a protruding portion 15 can be formed between adjoining recessed portions 14Ap. By modifying the type and concentration of the etching solution and the etching duration, the etching amount (i.e., the size and depth of the recessed portions 14Ap and the size of the tip end of the protruding portion 15) can be controlled. The etching solution used may be, for example, an aqueous solution of 10 mass % phosphoric acid, organic acid such as formic acid, acetic acid or citric acid, or sulfuric acid, or a chromate-phosphate mixture aqueous solution. For example, the etching is performed for 20 minutes using a phosphoric acid aqueous solution (10 mass %, 30° C.).

Thereafter, the aluminum film 18 may be again partially anodized such that the recessed portions 14Ap are grown in the depth direction and the thickness of the porous alumina layer 14 is increased as shown in FIG. 4(d). Here, the growth of the recessed portions 14Ap starts at the bottoms of the previously-formed recessed portions 14Ap, and accordingly, the lateral surfaces of the recessed portions 14Ap have stepped shapes.

Thereafter, when necessary, the porous alumina layer 14 may be brought into contact with an alumina etchant to be further etched such that the pore diameter of the recessed portions 14Ap can be further increased. The etching solution used in this step may preferably be the above-described etching solution. Practically, the same etching bath may be used.

In this way, by for example alternately repeating the anodization step and the etching step as described above through multiple cycles, the metal member 100A that has the protruding portions 15 at the surface is obtained as shown in FIG. 4(e). In the metal member 100A, the two-dimensional size Dp of the recessed portions 14Ap is equal to the adjoining distance Dint of the recessed portions 14Ap.

The porous alumina layer 14 (thickness: $t_p$) shown in FIG. 4(e) includes a porous layer (whose thickness is equivalent to the depth Dd of the recessed portions 14Ap) and a barrier layer (thickness: $t_b$). The thickness of the porous alumina layer 14, $t_p$, is not more than about 1 μm. The recessed portions 14Ap of the porous alumina layer 14 may have, for example, a conical shape and may have a stepped lateral surface. As described above, the adjoining distance Dint of the recessed portions 14Ap is generally equal to twice the thickness $t_b$ of the barrier layer.

Under the porous alumina layer 14 shown in FIG. 4(e), there is a metal remnant layer (aluminum remnant layer) 18r. The metal remnant layer 18r is part of the aluminum film 18 which has not been anodized. When necessary, the aluminum film 18 may be substantially thoroughly anodized such that the aluminum remnant layer 18r is not present. For example, when the inorganic material layer 16 has a small thickness, it is possible to readily supply an electric current from the aluminum base 12 side.

The manufacturing method of the metal member illustrated herein is capable of manufacturing a mold for production of antireflection films disclosed in Patent Documents 2 to 4. An antireflection film used in high definition display panels preferably has raised portions with pointed tip ends. Thus, in a manufacturing method of a mold for production of an antireflection film, it is preferred that the above-described anodization step and etching step are alternately repeated through multiple cycles (e.g., 5 cycles: including 5 anodization cycles and 4 etching cycles), and the process is ended with an anodization step, such that the bottoms of the recessed portions 14Ap are pointed.

On the other hand, the microbicidal activity of the metal member does not require the bottoms of the recessed portions 14Ap to be pointed, and therefore, the above-described mold manufacturing method can be simplified. For example, the manufacturing process of the metal member may be ended with an anodization step or may be ended with an etching step. The anodization step and the etching step each may be performed one time for manufacture of the metal member 100A. The bottoms of the recessed portions 14Ap may be pointed as illustrated in FIG. 4(e). The bottoms of the recessed portions 14Ap is not limited to this example but may have a rounded end. The bottoms of the recessed portions 14Ap may be flat. That is, the shape of the recessed portions 14Ap may be generally circular truncated cone.

Note that, however, it is preferred that the etching step is performed at least once in order to form the protruding portion 15. This is because the two-dimensional size Dp of the recessed portions 14Ap is enlarged by the etching step. For example, the etching step may be appropriately performed till the two-dimensional size Dp of the recessed portions 14Ap becomes equal to the adjoining distance Dint of the recessed portions 14Ap.

By alternately performing the anodization step and the etching step, the lateral surface of the recessed portions 14Ap is, for example, inclined with respect to the normal direction of the surface. At least part of the lateral surface of the recessed portions 14Ap may be stepped, for example.

In order that the metal member has an excellent microbicidal activity, it is estimated that the tip end of the protruding portion 15 preferably consists of points. After the recessed portions 14Ap are formed, the anodization step and/or the etching step may be appropriately repeated till the tip end of the protruding portion 15 between adjoining recessed portions 14Ap become pointed. For example, when the opening of a generally-conical recessed portion 14Ap is enlarged, part of the bottom of the recessed portion 14Ap which is most distant from the center 14o finally remains so that a acute protrusion 14c can be formed.

After the metal member 100A is obtained through the above-described manufacturing process, a treatment for stabilizing the surface of the metal member 100A (e.g., heat treatment) may be performed when necessary. The stabilizing treatment can be carried out without sealing the recessed portions 14Ap. For example, a heat treatment is performed on the metal member 100A in an oven, whereby the surface of the metal member 100A can be stabilized.

The color of the metal member which did not undergo the stabilizing treatment sometimes changed after being in contact with, for example, water for a certain period of time. The color of the metal member sometimes changed to be transparent. Such a change in color (including conversion to a transparent state) was perceived by visual observation. It is estimated that the shape of the inverted moth-eye structure at the surface of the metal member changed and, accordingly, the color of the surface of the metal member changed. By performing the stabilizing treatment, the change in color of the metal member and the change of the shape of the inverted moth-eye structure at the surface can be prevented. For example, as will be described later with experimental examples, the color of a metal member which underwent a heat treatment for 3 hours in an oven at not less than 100° C. and not more than 250° C. did not change even after being in contact with water for 49 hours. Specific conditions of the stabilizing treatment will be described later with reference to experimental examples.

The metal member 100B shown in FIG. 1(b) can be manufactured by, for example, combination of the above-described anodization step and etching step. A manufacturing method of the metal member 100B is described with reference to FIGS. 5(a) to 5(c).

First, in the same way as described with reference to FIGS. 4(a) and 4(b), a mold base 10 is provided, and a surface 18s of the aluminum film 18 is anodized to form a porous alumina layer 14 which has a plurality of recessed portions (micropores) 14Bp.

Figure 5:
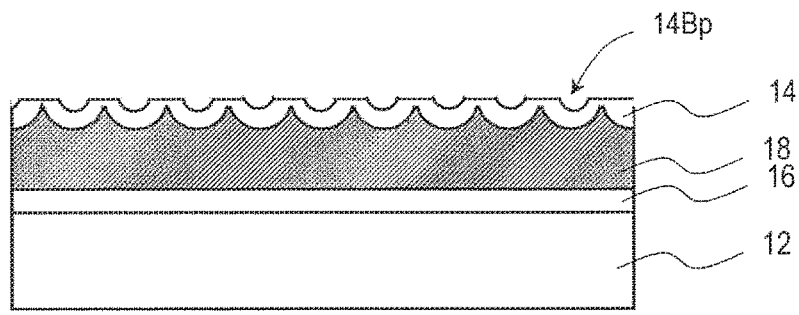
FIG. 5 (*a*) to (*c*) are diagrams for illustrating a manufacturing method of the metal member 100B and the configuration of the metal member 100B.
Figure 5:
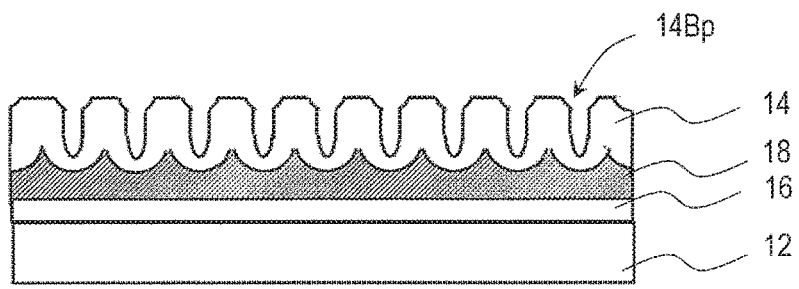
Figure 5:
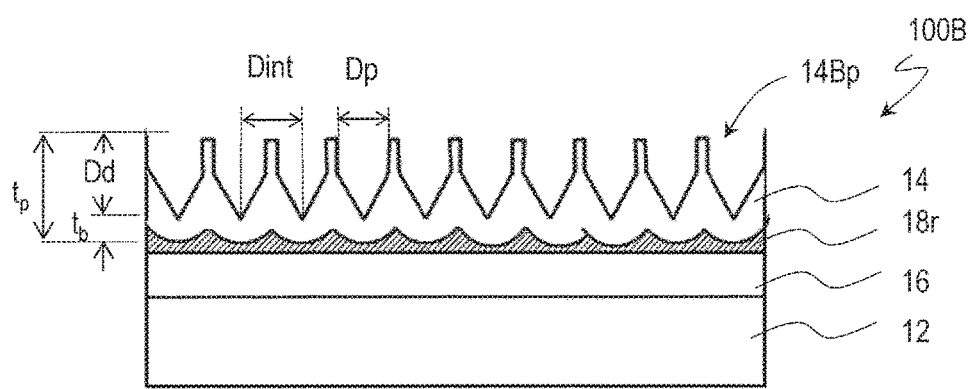

Then, the porous alumina layer 14 is brought into contact with an alumina etchant such that a predetermined amount is etched away, whereby the opening of the recessed portions 14Bp is enlarged as shown in FIG. 5(a). Here, the etched amount is smaller than that in the etching step described with reference to FIG. 4(c). That is, the size of the opening of the recessed portions 14Bp is reduced. For example, the etching is performed for 10 minutes using a phosphoric acid aqueous solution (10 mass %, 30° C.)

Thereafter, the aluminum film 18 may be again partially anodized such that the recessed portions 14Bp are grown in the depth direction and the thickness of the porous alumina layer 14 is increased as shown in FIG. 5(b). Here, for example, the depth of the growth of the recessed portions 14Bp is greater than in the anodization step described with reference to FIG. 4(d). For example, the anodization is performed with an applied voltage of 80 V for 165 seconds using an oxalic acid aqueous solution (concentration: 0.3 mass %, solution temperature: 10° C.) (55 seconds in FIG. 4(d)).

Thereafter, the etching step and the anodization step may be alternately repeated through multiple cycles in the same way as illustrated with reference to FIG. 4(e). For example, 3 cycles of the etching step and 3 cycles of the anodization step are alternately repeated, whereby the metal member 100B is obtained as shown in FIG. 5(c). In this step, the two-dimensional size Dp of the recessed portions 14Bp is smaller than the adjoining distance Dint (Dp<Dint). The recessed portions 14Bp formed through the anodization step and the etching step may be the same as the recessed portions 14Ap except that the two-dimensional size Dp is smaller than the adjoining distance Dint. The manufacturing process of the recessed portions 14Bp may be the same as the manufacturing process of the recessed portions 14Ap except for, for example, the etched amount in the etching step of FIG. 5(a).

The manufacturing method of the metal members 100A and 100B illustrated herein enables manufacture of a mold which is for production of antireflection films disclosed in Patent Documents 2 to 4. Since an antireflection film used in a high-definition display panel is required to have high uniformity, selection of the material of the aluminum base, specular working of the aluminum base, and control of the purity and components of the aluminum film are preferably carried out as described above. However, the above-described mold manufacturing method can be simplified because the microbicidal activity can be achieved without high uniformity. For example, the surface of the aluminum base may be directly anodized. Even if, in this case, pits are formed due to impurities contained in the aluminum base, only local structural irregularities occur in the uneven structure of the finally-obtained metal member, and it is estimated that there is little adverse influence on the microbicidal activity.

Figure 6:
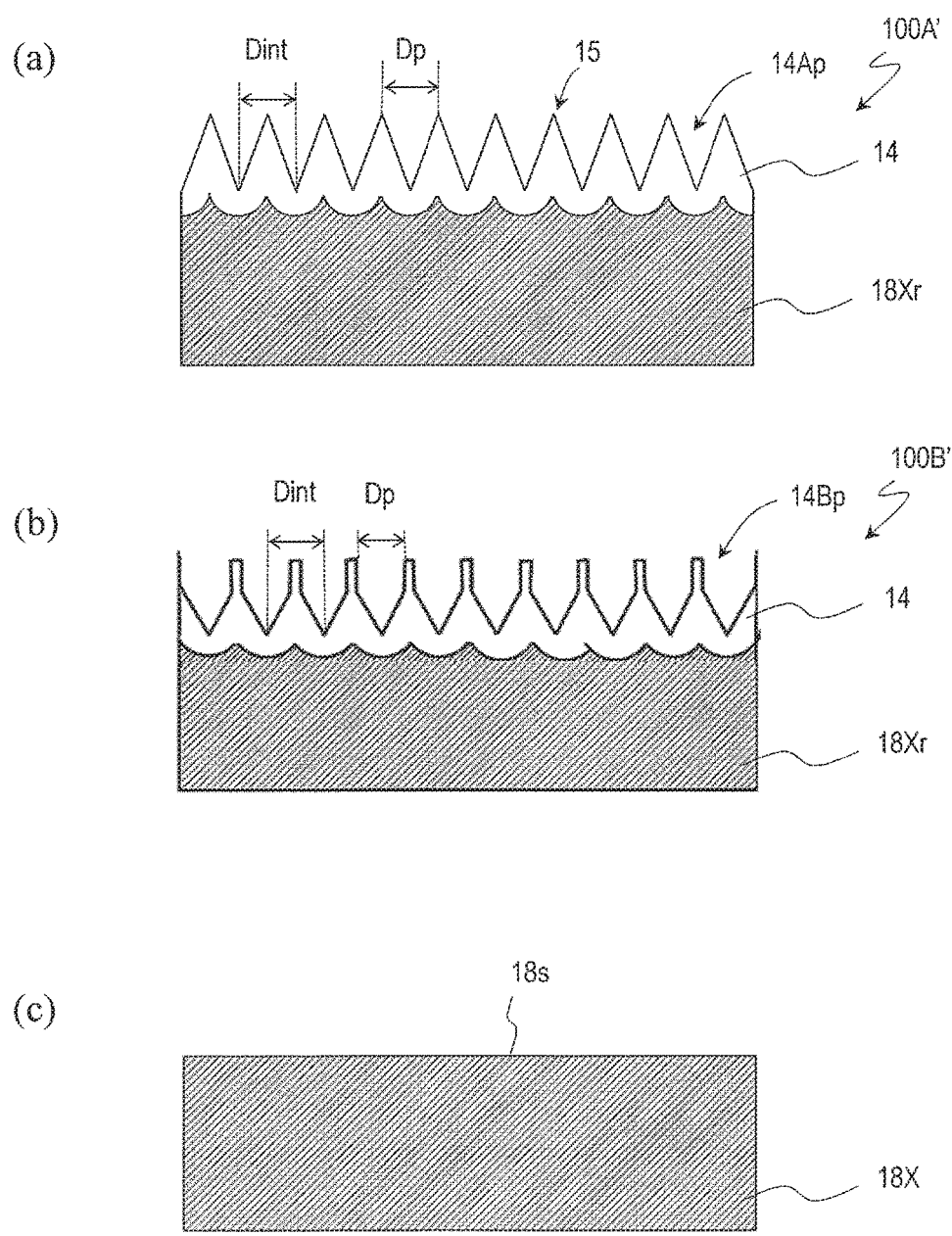
FIG. 6 (*a*) is a schematic cross-sectional view of a metal member 100A' of still another embodiment of the present invention. (*b*) is a schematic cross-sectional view of a metal member 100B' of still another embodiment of the present invention. (*c*) is a schematic diagram for illustrating manufacturing methods of the metal member 100A' and the metal member 100B'.

The configurations and a manufacturing method of a metal member 100A' of still another embodiment of the present invention and a metal member 100B' of still another embodiment of the present invention are described with reference to FIG. 6. FIG. 6(a) shows a schematic cross-sectional view of the metal member 100A' of still another embodiment of the present invention. FIG. 6(b) shows a schematic cross-sectional view of the metal member 100B' of still another embodiment of the present invention. FIG. 6(c) shows a schematic diagram for illustrating manufacturing methods of the metal member 100A' and the metal member 100B'.

The metal member 100A' is different from the metal member 100A in that the surface 18s of a metal base 18X illustrated in FIG. 6(c) is directly anodized in manufacture. The metal member 100A' is manufactured without providing the mold base 10 illustrated in FIG. 4(a). The metal member 100A' is different from the metal member 100A in that the metal member 100A' includes a metal base 18Xr instead of the metal base 12, the inorganic material layer 16 and the metal remnant layer 18r of the metal member 100A. The metal member 100A' may be the same as the metal member 100A except for the above-described points.

The manufacturing method of the metal member 100A' may be the same as the manufacturing method of the metal member 100A except that the metal base 18X is provided. For example, after the metal base 18X is provided, the recessed portions 14Ap can be formed using the conditions for formation of the porous anodized layer 14 which have been previously described with reference to FIG. 4(b) to FIG. 4(e). The porous anodized layer 14 which has the recessed portions 14Ap is formed on the remaining metal base 18Xr, whereby the metal member 100A' shown in FIG. 6(a) can be obtained.

The metal base 18X is made of an anodizable metal. The metal base 18X is, for example, a valve metal or stainless steel. The metal base 18X may contain a metal which is known to have a high antibacterial effect (for example, gold (Au), silver (Ag), platinum (Pt) or copper (Cu)).

The metal member 100A' (e.g., made of aluminum) which has regularly-arranged recessed portions may be, for example, manufactured as follows. A mold for production of an antireflection films disclosed in Patent Documents 2 to 4 is preferably configured such that the regularity of the arrangement of the recessed portions is low. It is estimated that, when the microbicidal ability of the uneven structure of the porous anodized layer is utilized, the regularity of the arrangement of the recessed portions does not affect.

After the aluminum base 18X is provided, the following steps are performed. For example, after formation of a porous alumina layer having a thickness of about 10 μm, the formed porous alumina layer is removed by etching, and then, anodization may be performed under the conditions for formation of the above-described porous alumina layer. A 10 μm thick porous alumina layer is realized by extending the anodization duration. When such a relatively thick porous alumina layer is formed and then this porous alumina layer is removed, a porous alumina layer having regularly-arranged recessed portions can be formed without being influenced by irregularities which are attributed to grains that are present at the surface of an aluminum film or aluminum base or the process strain. Note that, in removal of the porous alumina layer, using a mixture solution of a chromate and a phosphate is preferred. Although continuing the etching for a long period of time sometimes causes galvanic corrosion, the mixture solution of a chromate and a phosphate has the effect of suppressing galvanic corrosion.

The metal member 100B' shown in FIG. 6(b) is different from the metal member 100A' in that the uneven structure of the surface of the porous anodized layer 14 includes a plurality of recessed portions 14Bp. The metal member 100B' may be the same as the metal member 100A' except for the plurality of recessed portions 14Bp. The manufacturing process of the metal member 100B' is the same as that of the metal member 100A' except for the step of forming the plurality of recessed portions 14Bp.

The manufacturing methods of the metal member 100B and the metal member 100B' are not limited to that described above. The metal member 100B and the metal member 100B' can be manufactured only by the anodization step without the etching step (see, for example, Sample No. 5 which will be described later). In this case, the shape of the recessed portions 14Bp may be, for example, generally cylindrical. The lateral surface of the recessed portions 14Bp may be generally parallel to the normal direction of the surface.

Hereinafter, it is explained with experimental examples that a metal member of an embodiment of the present invention has a microbicidal ability.

To prepare respective samples, a tantalum oxide layer and an aluminum alloy layer (Al—Ti layer) were sequentially formed on a glass plate. The above-described anodization step and etching step were alternately performed (5 anodization cycles and 4 etching cycles) such that a porous alumina layer whose surface had an inverted moth-eye structure was formed on the glass plate, whereby Sample No. 1 was obtained.

Sample No. 2 was obtained by applying a mold releasing agent on the surface of a sample which was the same as Sample No. 1. The mold releasing agent used was OPTOOL DSX manufactured by DAIKIN INDUSTRIES, LTD. The mold releasing agent was poured over the surface and, thereafter, the sample was spun by a spinner such that the mold releasing agent uniformly spread over the glass plate.

Sample No. 3 and Sample No. 4 were obtained by applying a silane coupling agent S1 and a silane coupling agent S2, respectively, on the surface of a sample which was the same as Sample No. 1. The silane coupling agent SI was KBM-1403 manufactured by Shin-Etsu Chemical Co., Ltd., which does not contain an amino group. The silane coupling agent S2 was KBM-603 manufactured by Shin-Etsu Chemical Co., Ltd., which contains an amino group. The silane coupling agent S1 and the silane coupling agent S2 are represented by chemical formulae (structural formulae) (1) and (2) shown below.

[Chemical Formula 1]

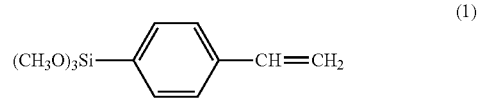

(1)

(2)

The silane coupling agents S1 and S2 used were undiluted solutions. Also in Sample No. 3 and Sample No. 4, after a silane coupling agent was applied to the surface, the sample was spun by a spinner.

Figure 7:
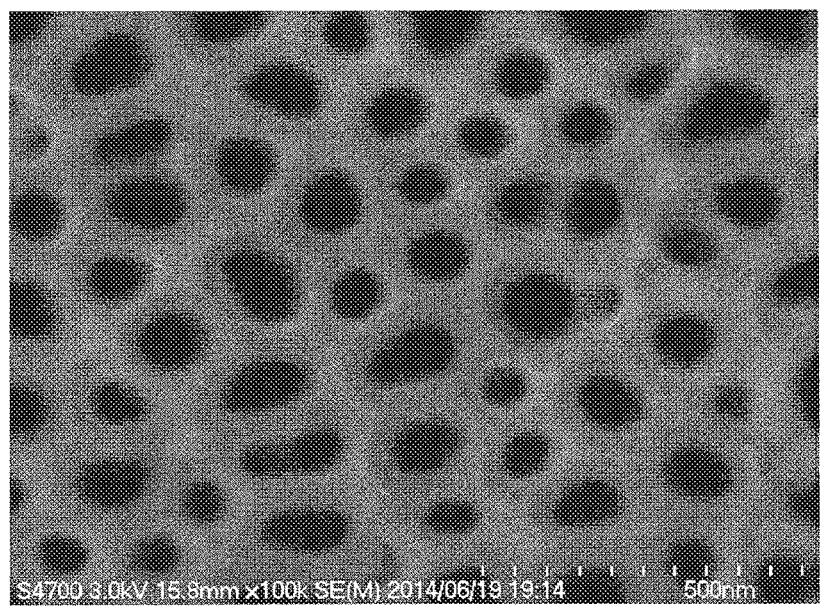
FIG. 7 (*a*) is a SEM image of a surface of Sample No. 3 observed by a SEM (scanning electron microscope). (*b*) is a SEM image of a cross section of Sample No. 3 observed by a SEM.
Figure 7:
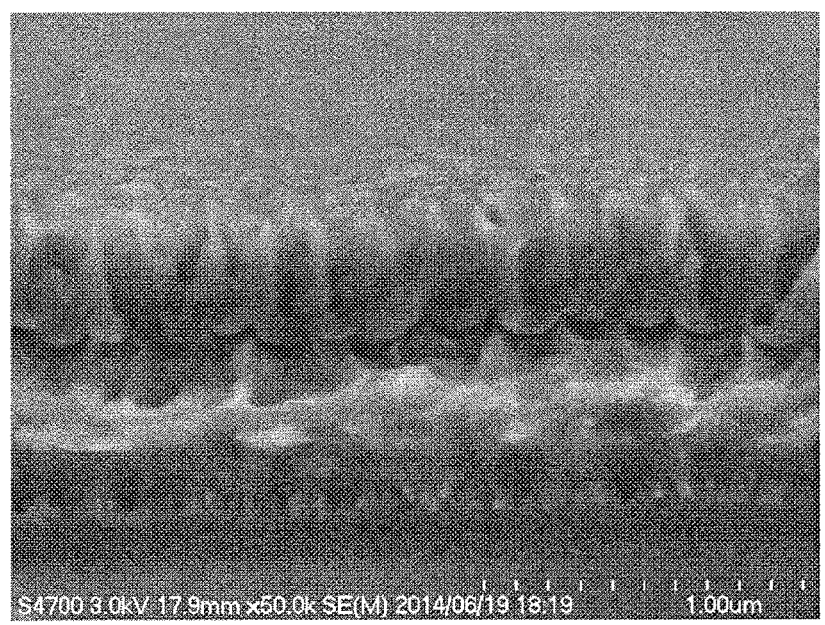

We confirmed using a scanning electron microscope (SEM) that, in Sample No. 2 to Sample No. 4, the inverted moth-eye structure at the surface of the porous alumina layer was not buried with the mold releasing agent or silane coupling agent. FIG. 7(a) shows a SEM image of the surface of Sample No. 3 observed by a SEM. FIG. 7(b) is a SEM image of a cross section of Sample No. 3 observed by a SEM. As shown in FIG. 7(a) and FIG. 7(b), it can be confirmed that the recessed portions are not buried. The same was confirmed also in the other samples.

The contact angles of water and hexadecane at 22° C. with respect to the respective samples were measured. In the measurement, a contact angle meter (PCA-1 manufactured by Kyowa Interlace Science Co., Ltd) was used. The average value of five measurements of the contact angle is shown in Table 1.

TABLE 1

| No. | AGENT APPLIED TO SURFACE | CONTACT ANGLE OF WATER [°] | CONTACT ANGLE OF HEXADECANE [°] |
|---|---|---|---|
| 1 | NONE | 109.4 | 29.3 |
| 2 | MOLD RELEASING AGENT | 137.2 | 110.4 |
| 3 | SILANE COUPLING AGENT S1 | 106.7 | 26.7 |
| 4 | SILANE COUPLING AGENT S2 | 53.6 | 22.7 |

The microbicidal ability was evaluated through the following procedure:

1. Bacterial dilution A' whose bacteria count was on the order of 1E+05 CFU/mL was prepared. The counted number of bacteria in the bacterial dilution A' was 4.2E+05 CFU/mL.

2. 1/500 NB culture medium (NB culture medium (nutrient broth medium E-MC35 manufactured by Eiken Chemical Co., Ltd.) diluted 500-fold with sterilized water) was added as a nutrient source to the bacterial dilution A' of step 1. (in accordance with JIS2801 5.4a)). This bacterial dilution is referred to as "bacterial dilution A".

3. A 400 μL drop of the bacterial dilution A was placed on the surface of each of Sample No. 1 to Sample No. 4, and a cover was placed thereon.

4. Each of Sample No. 1 to Sample No. 4 was placed in a transparent container. In the container, absorbent cotton wetted with a 400 μL drop of sterilized water was placed together for the purpose of preventing drying of the sample.

5. To examine the results obtained after the passage of three different time periods (0.1 hours, 4 hours, and 24 hours), three sets of Sample No. 1 to Sample No. 4 obtained through steps 3. and 4. were prepared.

6. The sets of samples to be examined as to the results obtained after the passage of 4 hours and 24 hours were each placed in a large container. In the large container, a beaker containing 150 mL sterilized water and a kimtowel wetted with 40 mL sterilized water were placed together for the purpose of further preventing drying of the samples. The large container was closed with a lid, and the samples were cultured at 35° C. for the respective predetermined time periods.

7. After the passage of the predetermined time periods (0.1 hours, 4 hours, and 24 hours), the bacteria were collected by washing. 9.6 mL sterilized water was put into a filter bag. The lid and samples were put into the filter bag and sufficiently washed by rubbing. The resultant bacterial solution is referred to as "bacterial dilution B".

8. The bacterial dilution B was diluted with sterilized water. A solution obtained by diluting 10-fold the bacterial dilution B is referred to as "bacterial dilution C". A solution obtained by diluting 100-fold the bacterial dilution B is referred to as "bacterial dilution D".

9. The bacterial dilutions were dropped onto Petrifilms and cultured at 35° C. for 2 days, and the number of bacteria in the bacterial dilution B was counted. The bacterial dilutions dropped onto Petrifilms were 1 mL bacterial dilution C and 1 mL bacterial dilution D for the time period of 0.1 hours, 1 mL bacterial dilution C and 1 mL bacterial dilution D for the time period of 4 hours, and 1 mL bacterial dilution B, 1 mL bacterial dilution C and 1 mL bacterial dilution D for the time period of 24 hours.

Figure 8:
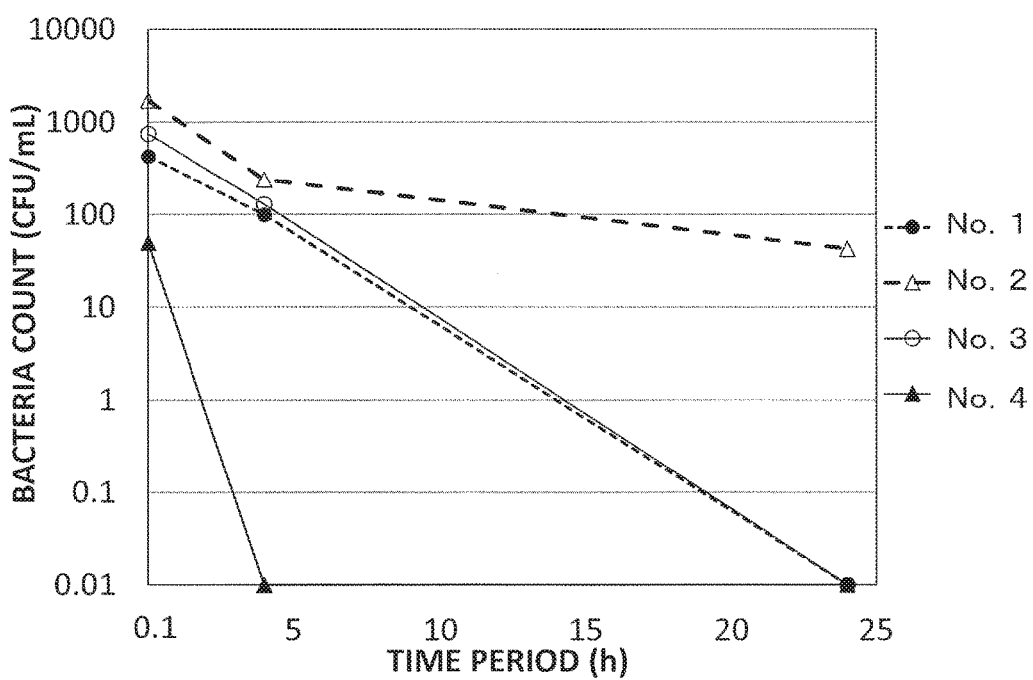
FIG. 8 A graph showing the bacteria count (CFU/mL) in the bacterial dilution B over the time period (h) in Sample No. 1 to Sample No. 4.

The results are shown in Table 2 presented below and FIG. 8. FIG. 8 is a graph showing the bacteria count (CFU/mL) in the bacterial dilution B over the time period (h). Note that, in FIG. 8, when the bacteria count is 0, it is plotted as 0.01 for the sake of visibility.

TABLE 2

| TIME PERIOD [h] | 0.1 | 4 | 24 |
|---|---|---|---|
| No. 1 [CFU/mL] | 430 | 100 | 0 |
| No. 2 [CFU/mL] | 1720 | 240 | 43 |
| No. 3 [CFU/mL] | 750 | 130 | 0 |
| No. 4 [CFU/mL] | 50 | 0 | 0 |

Since the bacterial dilution B was obtained by diluting 25-fold the bacterial dilution A (whose bacteria count was on the order of 1E+05 CFU/mL), the bacteria count must be on the order of 1E+04 CFU/mL if without the microbicidal effect of the sample. That is, since the bacteria count in the bacterial dilution A' was 4.2E+05 CFU/mL, it is estimated that the bacteria count in the bacterial dilution B would be about 1.7E+04 CFU/mL if without the microbicidal effect of the sample.

As seen from Table 2 and FIG. 8, in all of Sample No. 1 to Sample No. 4, the bacteria count decreased, and the microbicidal activity was confirmed. Particularly in Sample No. 1, Sample No. 3 and Sample No. 4, the bacteria count decreased even after the passage of 0.1 hours, and it was confirmed that the microbicidal activity was fast-acting. In Sample No. 4, the bacteria count decreased by two orders of magnitude after the passage of 0.1 hours and the bacteria count was zero after the passage of 4 hours. It was thus verified that Sample No. 4 had a particularly high microbicidal effect.

In Sample No. 1 and Sample No. 3, the bacteria counts for each of the time periods were on the same order. As seen from Table 1 presented above, Sample No. 1 and Sample No. 3 had close values of the contact angles with respect to water and hexadecane respectively. The closeness of the results of the microbicidal effect can probably be attributed to that Sample No. 1 and Sample No. 3 had similar water-repellency and lipophilicity.

Sample No. 4 had a more excellent microbicidal activity than Sample No. 3. This can be attributed to an amino group contained in the silane coupling agent S2.

As seen from the results of the contact angles shown in Table 1 and the results shown in Table 2 presented above, the contact angle with respect to hexadecane is preferably not more than 110.4°, for example, in order that the metal member has an excellent microbicidal ability. More preferably, the contact angle with respect to hexadecane is not more than 29.3°.

Next, Sample No. 5 to Sample No. 7 were evaluated as to the microbicidal ability.

Sample No. 5 was formed using the same material as that of Sample No. 1. Note that, however, the uneven structure of the surface was formed by performing the anodization step only once, without performing the etching step.

Sample No. 6 was formed using the same material and the same method as those employed for Sample No. 1. As seen from Table 3 presented below, the contact angles with respect to water and hexadecane were approximately the same values as those of Sample No. 1.

Sample No. 7 was a PET film which did not have an uneven structure in the surface. The surfaces of Sample No. 5 to Sample No. 7 were not provided with a surface treatment agent.

Figure 9:
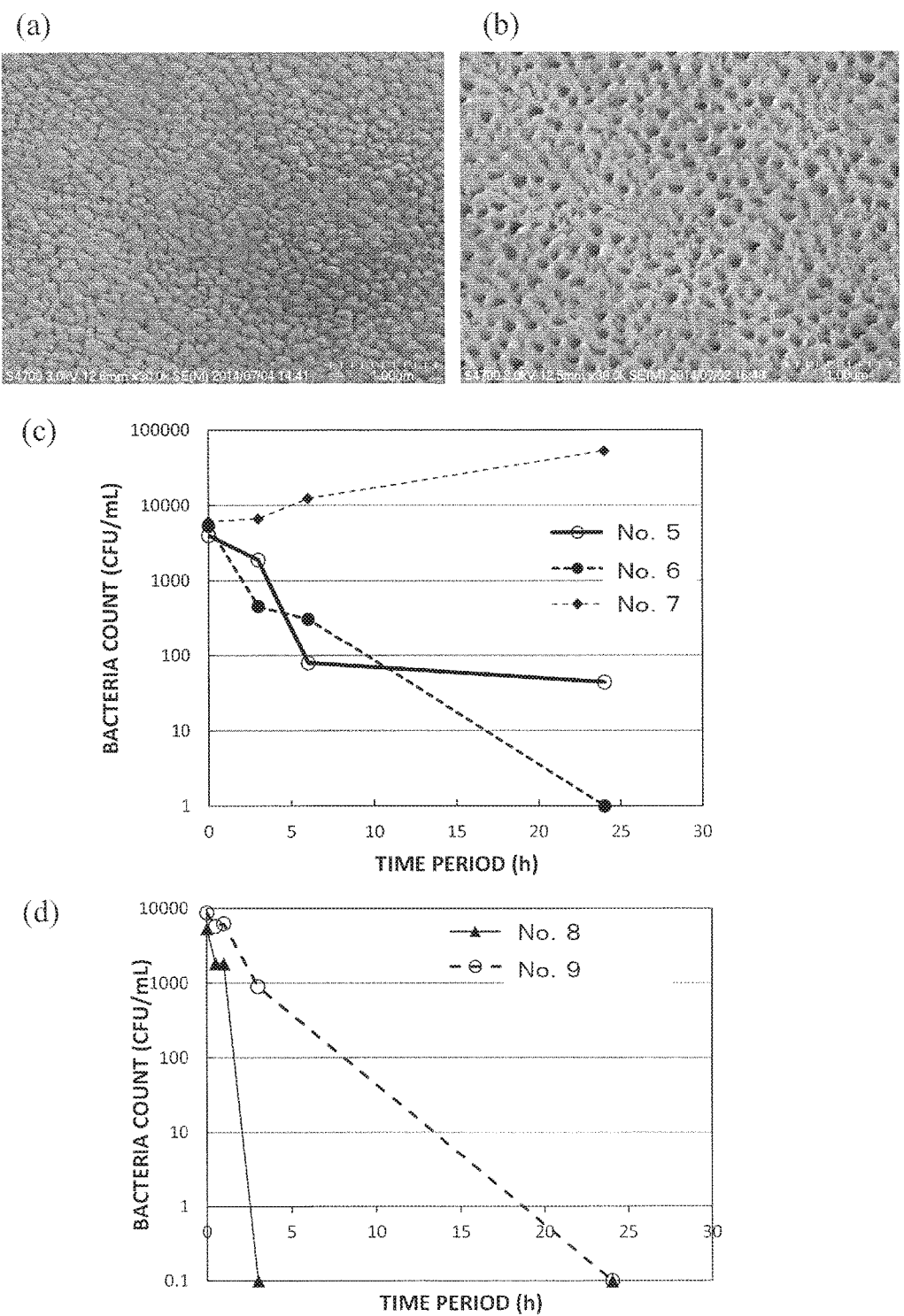
FIG. 9 (*a*) is a SEM image of a surface of Sample No. 5 which was observed by a SEM at an angle inclined by 45° from the normal direction of the surface. (*b*) is a SEM image of a surface of Sample No. 6 which was observed by a SEM at an angle inclined by 45° from the normal direction of the surface. (*c*) is a graph showing the bacteria count (CFU/mL) in the bacterial dilution B over the time period (h) in Sample No. 5 to Sample No. 7. (*d*) is a graph showing the bacteria count (CFU/mL) in the bacterial dilution B over the time period (h) in Sample No. 8 and Sample No. 9.

SEM images obtained by observing the surfaces of Sample No. 5 and Sample No. 6 using a SEM are shown in FIG. 9(a) and FIG. 9(b), respectively. FIG. 9(a) and FIG. 9(b) are SEM images of the surfaces of Sample No. 5 and Sample No. 6 which were observed by a SEM at an angle inclined by 45° from the normal direction of the surfaces. As seen from FIG. 9(b), in the surface of Sample No. 6, protruding portions were formed between adjoining recessed portions (black portions in the SEM image). On the other hand, as seen from FIG. 9(a), protruding portions were not formed in the surface of Sample No. 5. Regions between recessed portions in the surface (black portions in the SEM image) had a generally flat surface or a moderate curve.

The contact angles of the surfaces of the respective samples with respect to water and hexadecane were measured according to the same method as that described above. The results are shown in Table 3.

TABLE 3

| No. | AGENT APPLIED TO SURFACE | CONTACT ANGLE OF WATER [°] | CONTACT ANGLE OF HEXADECANE [°] |
|---|---|---|---|
| 5 | NONE | 13.9 | 7.1 |
| 6 | NONE | 109.6 | 29.4 |
| 7 | NONE | 61.0 | 9.0 |

Evaluation of the microbicidal ability of Sample No. 5 to Sample No. 7 was basically the same as the procedure described for Table 2 presented above. Note that, however, the examined time periods had four different lengths, 0.05 hours, 3 hours, 6 hours and 24 hours. The bacteria count in the bacterial dilution A' was 1.1E+05 CFU/mL. Therefore, it is estimated that, if without the microbicidal effect of the sample, the bacteria count in the bacterial dilution B that was obtained by diluting 25-fold the bacterial dilution A would be about 4.4E+03 CFU/mL.

The results are shown in Table 4 presented below and FIG. 9(c). FIG. 9(c) is a graph showing the bacteria count (CFU/mL) in the bacterial dilution B over the time period (h) in Sample No. 5 to Sample No. 7. Note that, in FIG. 9(c), when the bacteria count is 0, it is plotted as 1 for the sake of visibility.

TABLE 4

| TIME PERIOD [h] | 0.05 | 3 | 6 | 24 |
|---|---|---|---|---|
| No. 5 [CFU/mL] | 4000 | 1900 | 80 | 44 |
| No. 6 [CFU/mL] | 5400 | 460 | 310 | 0 |
| No. 7 [CFU/mL] | 6200 | 6650 | 12500 | 53200 |

As clearly seen from Table 4 and FIG. 9(c), in both Sample No. 5 and Sample No. 6, a microbicidal activity was confirmed. Particularly, Sample No. 6 had a more excellent microbicidal ability than Sample No. 5. None of Sample No. 5 and Sample No. 6 is provided with an agent on the surface. Therefore, Sample No. 5 and Sample No. 6 were different only in the physical structure of the surface. When only the physical structure of the surface was compared, it was confirmed that Sample No. 6 that had protruding portions had a more excellent microbicidal activity than Sample No. 5 that had no protruding portion. Sample No. 7 (PET) did not have a microbicidal activity, so that the bacteria count increased with the lapse of time.

Next, Sample No. 8 and Sample No. 9 were evaluated as to the microbicidal ability.

Sample No. 8 was formed using the same material and the same method as those employed for Sample No. 4. As seen from Table 5 presented below, the contact angles with respect to water and hexadecane were approximately the same values as those of Sample No. 4.

Sample No. 9 was obtained by applying the silane coupling agent S2 (which was the same as that used in Sample No. 4) to a surface of float glass.

The contact angles of the surfaces of Sample No. 8 and Sample No. 9 with respect to water and hexadecane were measured according to the same method as that described above. The results are shown in Table 5.

TABLE 5

| No. | AGENT APPLIED TO SURFACE | CONTACT ANGLE OF WATER [°] | CONTACT ANGLE OF HEXADECANE [°] |
|---|---|---|---|
| 8 | SILANE COUPLING AGENT S2 | 53.7 | 22.8 |
| 9 | SILANE COUPLING AGENT S2 | 51.3 | 7.8 |

Evaluation of the microbicidal ability of Sample No. 8 and Sample No. 9 was basically the same as the procedure described for Table 2 presented above. Note that, however, the examined time periods had five different lengths, 0.08 hours, 0.5 hours, 1 hours, 3 hours and 24 hours. The bacteria count in the bacterial dilution A' was 2.6E+05 CFU/mL. Therefore, it is estimated that, if without the microbicidal effect of the sample, the bacteria count in the bacterial dilution B that was obtained by diluting 25-fold the bacterial dilution A would be about 1.0E+04 CPU/mL.

The results are shown in Table 6 presented below and FIG. 9(d). FIG. 9(d) is a graph showing the bacteria count (CFU/mL) in the bacterial dilution B over the time period (h) in Sample No. 8 and Sample No. 9. Note that, in FIG. 9(d), when the bacteria count is 0, it is plotted as 0.1 for the sake of visibility.

TABLE 6

| TIME PERIOD [h] | 0.08 | 0.5 | 1 | 3 | 24 |
|---|---|---|---|---|---|
| NO. 8 [CFU/ML] | 5440 | 1860 | 1840 | 0 | 0 |
| NO. 9 [CFU/ML] | 8800 | 5800 | 6300 | 900 | 0 |

As clearly seen from Table 6 and FIG. 9(d), in both Sample No. 8 and Sample No. 9, a microbicidal activity was confirmed. Particularly, Sample No. 8 had a more excellent microbicidal ability than Sample No. 9. It was thus found that Sample No. 8 had a particularly excellent microbicidal ability due to the physical structure of the surface and the silane coupling agent S2 applied to the surface.

Subsequently, the effect of a stabilizing treatment performed on a metal member of an embodiment of the present invention was examined.

Three samples were provided which were formed using the same material and the same method as those employed for Sample No. 1 and subjected to a stabilizing treatment (here, heat treatment) under different conditions, whereby Sample No. 10 to Sample No. 12 were obtained. Specifically, Sample No. 10 to Sample No. 12 were put into an oven which was not yet heated, and thereafter, the oven was heated to reach a predetermined temperature. The predetermined temperature were 250° C. for Sample No. 10, 120° C. for Sample No. 11, and 100° C. for Sample No. 12. The samples were naturally dried (i.e., the surfaces of the samples were dry) before put into the oven. The oven was kept at the respective predetermined temperatures for 3 hours after reaching the predetermined temperatures, and then powered off. After the oven decreased to the normal temperature, the samples were taken out of the oven.

After the stabilizing treatment was performed, no change in color was found in each of Sample No. 10 to Sample No. 12. Therefore, it can be concluded that the stabilizing treatment did not cause a change in shape of the inverted moth-eye structure at the surface of the samples.

Sample No. 13 was formed using the same material and the same method as those employed for Sample No. 1 and was not subjected to the stabilizing treatment. In Sample No. 10 to Sample No. 13, the thickness $t_p$ of the porous alumina layer 14 (see FIG. 4(e)) was 100 nm to 300 nm.

In each of Sample No. 10 to Sample No. 13, 400 μL pure water was dropped onto the surface, and a cover was placed thereon. Each of Sample No. 10 to Sample No. 13 was placed in a transparent container, and the container was placed in a thermostatic bath at 37° C. It was examined by visual observation whether or not a change in color occurred in respective samples after the passage of the predetermined time periods (3 hours, 6 hours, 21 hours, 49 hours, 120 hours and 144 hours).

The results are shown in Table 7 presented below.

TABLE 7

| | TIME PERIOD [h] | | | | | |
|---|---|---|---|---|---|---|
| | 3 | 6 | 21 | 49 | 120 | 144 |
| No. 10 | ○ | ○ | ○ | ○ | ○ | ○ |
| No. 11 | ○ | ○ | ○ | ○ | ○ | ○ |
| No. 12 | ○ | ○ | ○ | ○ | x | x |
| No. 13 | ○ | ○ | ○ | x | x | x |

Figure 10:
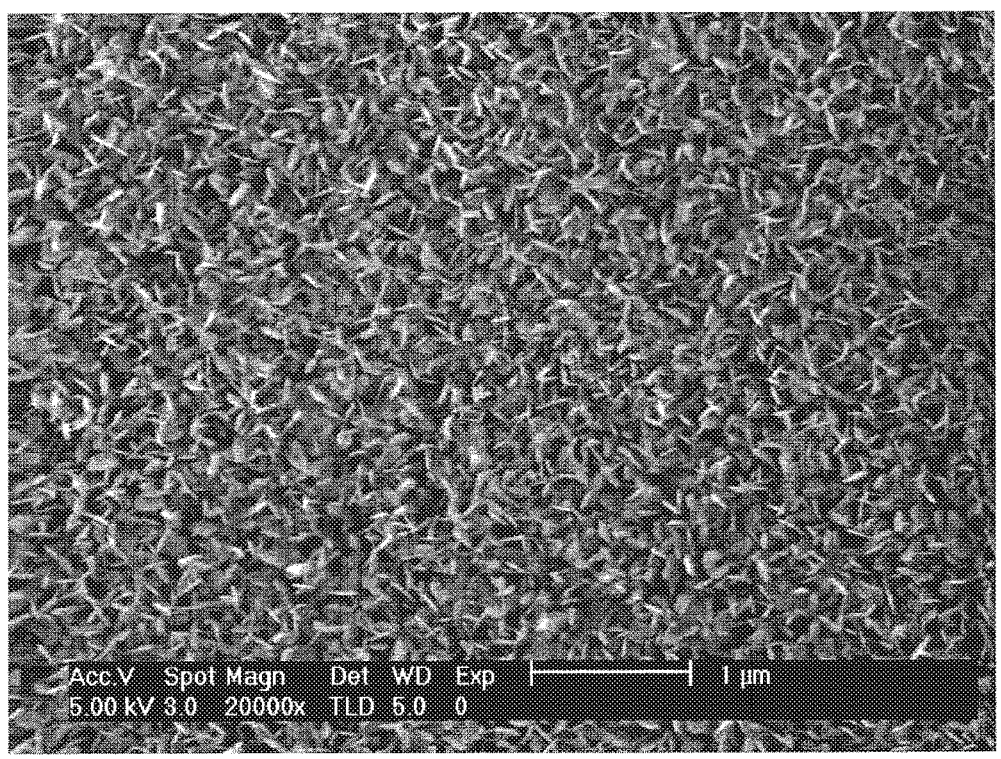
FIG. 10 A SEM image of the surface of a transparent portion of Sample No. 13 which was observed by a SEM.

In Table 7, "○" means that no change in color was found, and "x" means that a change in color was found. "x" includes a case where portions of the sample in contact with pure water became transparent. When the samples were kept in contact with air after the experiment, some of the transparent portions changed to a black color. FIG. 10 shows a SEM image of the surface of a transparent portion of Sample No. 13 which was observed by a SEM. As seen from FIG. 10, in a transparent portion of the metal member, the shape of the inverted moth-eye structure at the surface changed.

As seen from Table 7, in Sample No. 13 on which the stabilizing treatment was not performed, a change in color was found after the passage of 49 hours. In Sample No. 12 on which the stabilizing treatment was performed at 100° C., a change in color was found after the passage of 120 hours. In Sample No. 11 and Sample No. 10 on which the stabilizing treatment was performed at 120° C. and 250° C., respectively, a change in color was not found even after the passage of 144 hours.

For the sake of comparison, the same experiment as that performed on Sample No. 10 to Sample No. 13 was performed using a sample which was formed without the anodization step and the etching step. In this case, a change in color was not found under any set of conditions (with/without the stabilizing treatment, the temperature of the stabilizing treatment, the time period).

The present inventors' opinion about the mechanism of color change of the metal member is as follows.

It is estimated that a change in color of the metal member is attributed to a change in shape of the inverted moth-eye structure at the surface of the metal member. The present applicant found that the porous alumina layer 14 appears in a different color (i.e., reflected light appears to be colored) depending on the thickness $t_p$ of the porous alumina layer 14 and/or the shape of the recessed portions 14Ap. The results of systematic studies are disclosed in WO 2011/145625. The entire disclosure of WO 2011/145625 is incorporated by reference in this specification. The change in color of the metal member is probably attributed to that, for example, at least part of the porous alumina layer 14 reacted with water, so that aluminum hydroxide ($Al(OH)_3$) or aluminum oxide ($Al_2O_3 \cdot nH_2O$) or a hydrate thereof ($Al_2O_3 \cdot nH_2O$) was formed, and accordingly, the thickness $t_p$ of the porous alumina layer 14 and/or the shape of the recessed portions 14Ap changed. It is estimated that a change in color of the metal member occurs due to a reaction which is similar to a hydration reaction used in a sealing treatment on the porous anodized layer.

Further, it is estimated that, as well as the reaction of the porous alumina layer 14 with water, the aluminum remnant layer 18r underlying the porous alumina layer 14 also reacts with water or acid and changes into aluminum hydroxide or aluminum oxide or a hydrate thereof, so that the metal member becomes transparent. According to the present inventors, it was found that, in a sample which was partially changed in color and became transparent, a transparent portion was greater in thickness by about 3 μm than an unchanced portion. It can be estimated that the transparent portion was greater in thickness than the other portion due to formation of the above-described oxide or hydroxide.

Generally, a sealing treatment is well known as a treatment for stabilizing the surface of a porous anodized layer (e.g., porous alumina layer). A porous alumina layer as formed by anodization does not have high corrosion resistance but can have high corrosion resistance when provided with a sealing treatment. The sealing treatment is performed by, for example, treating porous alumina in a high-temperature and high-pressure steam or by boiling porous alumina in boiled pure water. It is estimated that, when the sealing treatment is performed, part of the porous alumina layer causes a hydration reaction, whereby micropores (recessed portions) are closed or reduced in size. Performing the sealing treatment at a higher temperature is preferred.

The stabilizing treatment performed on the metal member of an embodiment of the present invention is different from a generally-known sealing treatment in the following aspects. The stabilizing treatment is performed without sealing the micropores (recessed portions) 14Ap of the porous alumina layer 14. It is preferred that the stabilizing treatment is performed without changing the shape of the inverted moth-eye structure at the surface. Such a stabilizing treatment can improve the corrosion resistance of the metal member without affecting the microbicidal effect of the metal member of an embodiment of the present invention. It is preferred that the stabilizing treatment (e.g., heat treatment) is performed on, for example, a dried metal member.

As seen from the results of Table 7, it is preferred that the temperature of the stabilizing treatment (e.g., heat treatment) is, for example, not less than 100° C. More preferably, the temperature of the heat treatment is, for example, not less than 120° C. The duration of the heat treatment is, for example, 3 hours.

Generally, when a heat treatment (annealing) is performed on a processed metal, three stages called "recovery", "recrystallization" and "grain growth" occur. When the temperature of the processed metal is gradually increased, recovery first occurs at a relatively low temperature. In the recovery stage, lattice defects produced in crystals due to plastic deformation (e.g., point defects and dislocation) disappear. As the temperature is increased, new crystal grains having no strain are formed (recrystallization). As the temperature is further increased, the crystal grains grow further (grain growth). For example, in aluminum, recovery occurs at a temperature not more than about 200° C., recrystallization occurs at a temperature not less than about 200° C. and not more than about 350° C., and grain growth occurs at a temperature not less than about 350° C.

The stabilizing treatment on the metal member of an embodiment of the present invention is preferably performed such that the size of crystal grains does not change, i.e., grain growth does not occur, for the purpose of preventing deformation of the inverted moth-eye structure of the porous alumina layer 14. Further, it is more preferred that recrystallization does not occur. Therefore, the temperature of the stabilizing treatment (heat treatment) is preferably not more than 350° C., more preferably not more than 250° C. If the treatment temperature is high, there is a probability that the metal base 12, 18Xr, which supports the porous alumina layer 14, deforms. Further, from the viewpoint of suppressing the power consumption, the treatment temperature is preferably low. From such viewpoints, it is preferred that the temperature of the stabilizing treatment (heat treatment) is, for example, less than 150° C.

As clearly seen from the experimental examples, by performing the stabilizing treatment on the surface of the metal member of an embodiment of the present invention, a change in color of the metal member and deformation of the inverted moth-eye structure at the surface can be suppressed even if the metal member is in contact with water for a certain time period. Therefore, deterioration of the microbicidal effect which is attributed to deformation of the surface structure can be suppressed. The metal member of an embodiment of the present invention is applicable to, for example, the needs of the microbicidal activity (including preventing occurrence of fungi) in high-temperature, high-humidity environments. When the stabilizing treatment is performed, the metal member of an embodiment of the present invention is suitably used without losing its microbicidal effect even in high-temperature, high-humidity environments. When the stabilizing treatment is performed, change in appearance of the metal member of an embodiment of the present invention can be suppressed. Thus, when the stabilizing treatment is performed, the metal member of an embodiment of the present invention is suitably applicable to, for example, interior decoration materials which will be described later, without marring its design.

The stabilizing treatment may be performed before the treatment that is carried out with the surface treatment agent or may be performed after the treatment that is carried out with the surface treatment agent.

Embodiment 1

The metal member of an embodiment of the present invention is suitably applicable to, for example, a heat exchanger. Embodiment 1 of the present invention is a heat exchanger which includes the metal member of an embodiment of the present invention. Inclusion of a fin which is formed using the metal member of an embodiment of the present invention enables to realize a heat exchanger which has a microbicidal activity. Water produced by condensation of moisture in air can attach to the fin of the heat exchanger. The heat exchanger of an embodiment of the present invention is capable of suppressing occurrence of fungi due to drops of water on the fin. Note that the heat exchanger of Embodiment 1 of the present invention is not limited to examples which will be described in the following section.

Figure 11:
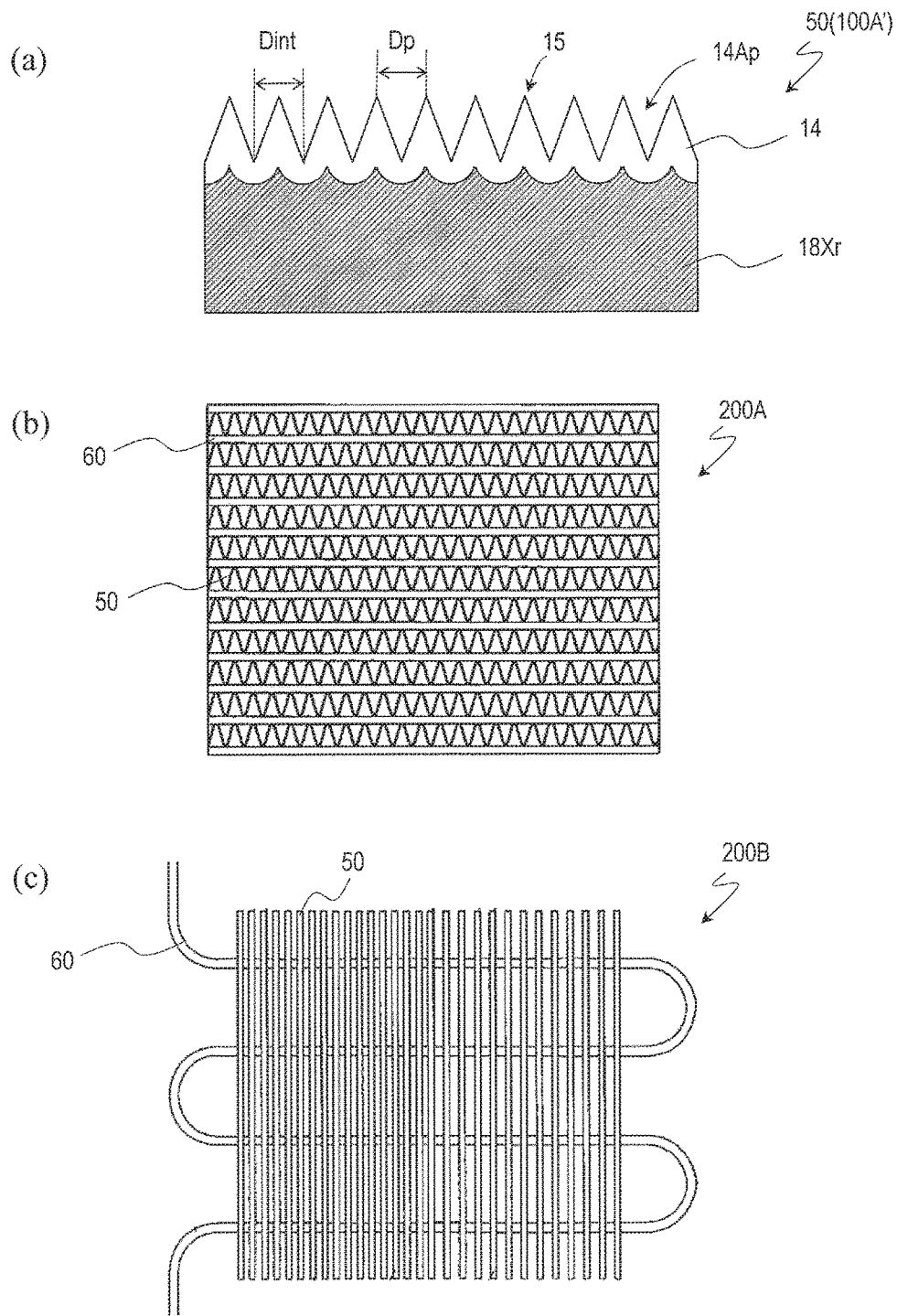
FIG. 11 (*a*) is a schematic cross-sectional view of a fin 50 of a heat exchanger of an embodiment of the present invention. (*b*) is a schematic cross-sectional view of a heat exchanger 200A of an embodiment of the present invention. (*c*) is a schematic cross-sectional view of a heat exchanger 200B of another embodiment of the present invention.

A heat exchanger 200A of an embodiment of the present invention and a heat exchanger 200B of another embodiment of the present invention are described with reference to FIG. 11(*a*) to FIG. 11(*c*). FIG. 11(*a*) is a schematic cross-sectional view of a fin 50 of the heat exchanger of Embodiment 1 of the present invention. FIG. 11(*b*) and FIG. 11(*c*) are schematic cross-sectional views of the heat exchanger 200A and the heat exchanger 200B, respectively, of the embodiments of the present invention.

As shown in FIG. 11(*a*), the fin 50 is formed using, for example, the metal member 100A'. The fin 50 includes a metal base 18Xr and a porous anodized layer 14 formed on the metal base 18Xr. The surface of the porous anodized layer 14 has a submicron-order uneven structure. The uneven structure includes a plurality of recessed portions 14Ap whose two-dimensional size viewed in the normal direction of the surface is more than 100 nm and less than 500 nm. The fin 50 has the same surface structure (including the physical structure and chemical properties) as that of the metal member 100A'.

As shown in FIG. 11(*b*), the heat exchanger 200A has the fin 50. Since the fin 50 has a surface which has a microbicidal activity, the heat exchanger 200A can have a microbicidal effect.

The fin 50 of the heat exchanger 200A is not limited to the metal member 100A' but may be formed using any of the above-described metal members of the embodiments of the present invention.

The heat exchanger 200A further includes, for example, a tube 60. For example, the tube 60 is filled with a coolant, and thermal energy is exchanged between the coolant and a gas or liquid in the heat exchanger 200A. Exchange of the thermal energy is realized via the fin 50. To improve the exchange efficiency of the thermal energy, it is preferred that the surface area of the fin 50 is large. As in the heat exchanger 200A shown in FIG. 11(*b*), for example, wavy fins 50 are provided between tubes 60 that are arranged so as to extend generally parallel with one another. Alternatively, as in the heat exchanger 200B shown in FIG. 11(c), a tube 60 may be in a wavy arrangement so as to penetrate through fins 50 that are arranged so as to extend generally parallel with one another. The heat exchanger 200B may be the same as the heat exchanger 200A except for the arrangement of the fins 50 and the tube 60.

The heat exchanger of Embodiment 1 of the present invention can be used in, for example, an air conditioner, refrigerator, or freezer. The air conditioner includes room air conditioners and vehicle's air conditioners. In the heat exchanger of Embodiment 1 of the present invention, the surface of the fin has a microbicidal ability, and therefore, occurrence of fungi due to drops of water on the fin can be suppressed. The surface can also have a microbicidal activity against a liquid or gas in the heat exchanger. In the heat exchanger of Embodiment 1 of the present invention, the surface of the fin has a submicron-order uneven structure, and therefore, the surface area of the fin is large, and the heat exchange efficiency can be improved.

Patent Document 5 mentioned above discloses a heat exchanger in which the surface of a fin has micropores formed by anodization. In the heat exchanger of Patent Document 5, micropores formed in the surface of the fin improve the water repellent property. In the heat exchanger of Patent Document 5, the micropores of the fin are formed by the anodization step without performing the etching step, and therefore, protruding portions are not formed between adjoining micropores.

The heat exchanger of Embodiment 1 of the present invention can have a microbicidal activity only due to the physical structure of the fin. Therefore, the heat exchanger can have a microbicidal activity without increasing the cost and/or the manufacturing process. Further, as described above, the microbicidal activity can be further improved by applying a surface treatment agent (e.g., mold releasing agent or coupling agent) to the surface of the fin.

The metal base of the fin is made of, for example, a valve metal. The porous anodized layer of the fin is formed by, for example, anodizing a valve metal. As the metal that forms the metal member and/or the porous anodized layer, stainless steel may be used. The metal base of the fin is, for example, an aluminum base. The porous anodized layer of the fin is, for example, a porous alumina layer. Aluminum is, for example, light in weight, low-cost, excellent in thermal conductivity, and easily processible, and is therefore often used for fins.

When the porous anodized layer of the fin is formed by anodizing titanium, a microbicidal effect due to photocatalysis can be realized by irradiating the fin with light (e.g., ultraviolet light) because titanium oxide is a photocatalytically active substance. The microbicidal effect of the heat exchanger can further improve. For example, when the heat exchanger is used in an air conditioner which can be irradiated with light from an indoor fluorescent lamp or an outdoor unit which is placed outside the house and which can be irradiated with light from the sun, there is a probability that a microbicidal effect due to photocatalysis can be realized without bothering to irradiate with light (e.g., ultraviolet light).

Figure 12:
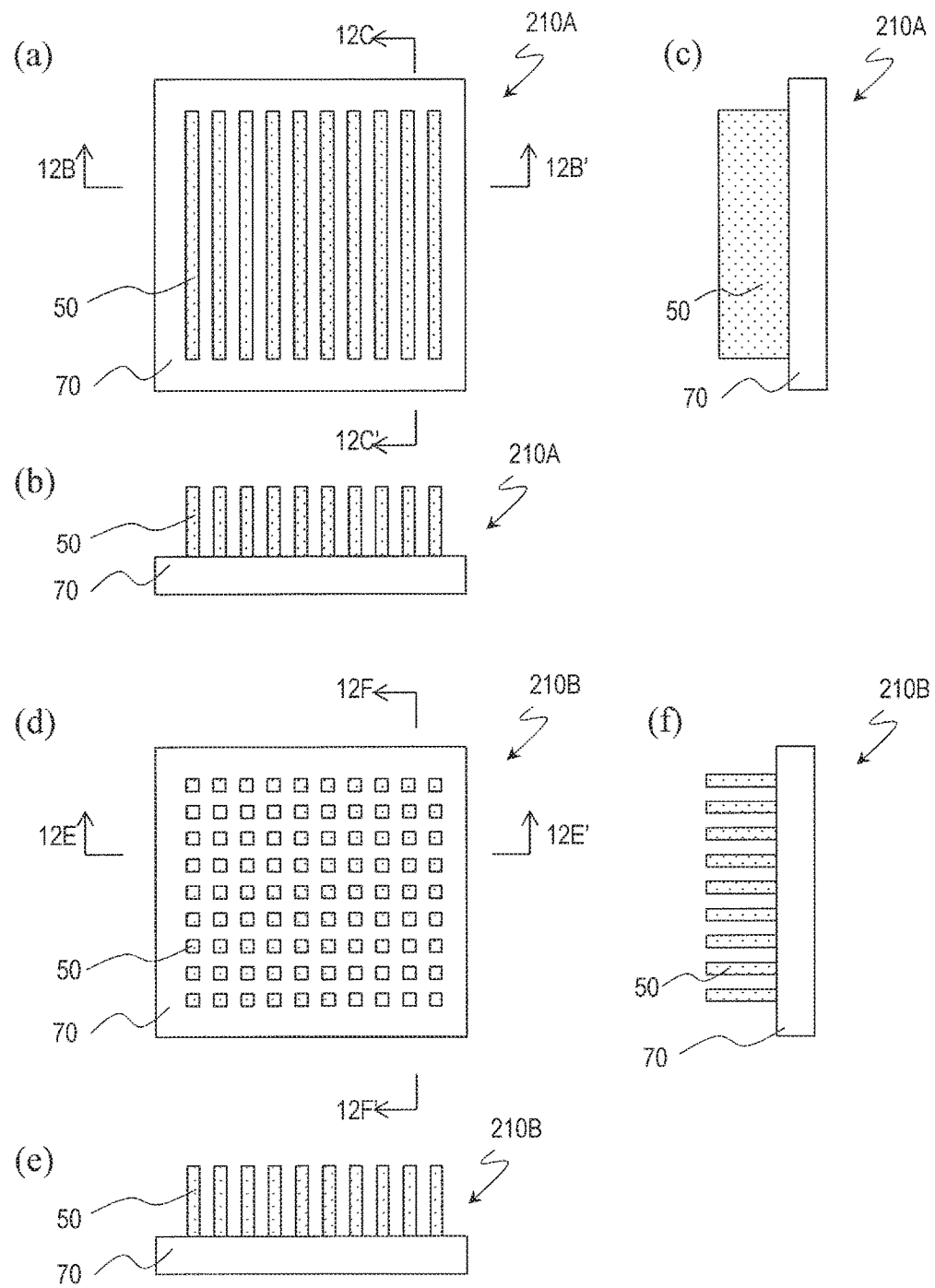
FIG. 12 (*a*) is a schematic plan view of a heat dissipation unit 210A of an embodiment of the present invention. (*b*) and (*c*) are cross-sectional views of the heat dissipation unit 210A taken along line 12B-12B' and line 12C-12C', respectively, of (*a*). (*d*) is a schematic plan view of a heat dissipation unit 210B of another embodiment of the present invention. (*e*) and (*f*) are cross-sectional views of the heat dissipation unit 210B taken along line 12E-12E' and line 12F-12F', respectively, of (d).

Next, a heat dissipation unit (heat sink) 210A of an embodiment of the present invention and a heat dissipation unit 210B of another embodiment of the present invention are described with reference to FIG. 12(a) to FIG. 12(f). FIG. 12(a) and FIG. 12(d) are schematic plan views of the heat dissipation unit 210A and the heat dissipation unit 210B, respectively, of embodiments of the present invention. FIG. 12(b) and FIG. 12(c) are cross-sectional views of the heat dissipation unit 210A taken along line 12B-12B' and line 12C-12C', respectively, of FIG. 12(a). FIG. 12(e) and FIG. 12(f) are cross-sectional views of the heat dissipation unit 210B taken along line 12E-12E' and line 12F-12F', respectively, of FIG. 12(d).

In the heat dissipation unit 210A and the heat dissipation unit 210B, the fin 50 has a surface which has a microbicidal activity. Therefore, the heat dissipation unit 210A and the heat dissipation unit 210B can have a microbicidal effect. The heat dissipation unit 210A and the heat dissipation unit 210B can have a microbicidal activity against a gas in the heat dissipation unit. The surface of the fin 50 has a submicron-order uneven structure, and therefore, the surface area of the fin 50 is large, and the heat exchange efficiency can be improved.

The heat dissipation unit 210A further includes, for example, a plate 70. The fin 50 is provided on the plate 70. When viewed in the normal direction of the plate 70, the fin 50 has, for example, a stripe shape as illustrated in FIG. 12(a) to FIG. 12(c). As in the heat dissipation unit 210B shown in FIG. 12(d) to FIG. 12(f), the fin 50 may be in a square lattice arrangement when viewed in the normal direction of the plate 70. The heat dissipation unit of an embodiment of the present invention is not limited to these examples. The shape and arrangement of the fin 50 may be arbitrary. For example, the fin 50 may be in a broken line arrangement. For example, the fin 50 may be in a checkerboard arrangement. The shape of the plate 70 is not limited to the illustrated examples. For example, fins may be radially arranged on a circular plate 70.

In this specification, examples of the heat exchanger include a variety of heat exchangers, such as radiators, evaporators, condensers, coolers, heaters, heat dissipation units (heat sink), etc., and the heat exchanger is not limited to the illustrated examples.

For example, the heat exchanger of Embodiment 1 of the present invention may be used in an evaporative cooler. The evaporative cooler is a device which is designed to decrease the temperature of air by the utilization of the heat of vaporization of water.

Embodiment 2

The metal member of an embodiment of the present invention is suitably used in interior decoration materials. Embodiment 2 of the present invention is an interior decoration material which includes the metal member of an embodiment of the present invention. Note that the interior decoration material of Embodiment 2 of the present invention is not limited to examples which will be described in the following section.

The metal member of an embodiment of the present invention can be used in, for example, a doorknob or handrail. The doorknob or handrail can have a microbicidal activity when it has the same surface structure (including the physical structure and chemical properties) as that of the metal member of an embodiment of the present invention. The doorknob or handrail is frequently touched by hands so that moisture and organic substances which are nutrient sources of microorganisms can attach to the doorknob or handrail. The interior decoration material of an embodiment of the present invention is capable of suppressing occurrence of microorganisms (including fungi) due to moisture and/or organic substances.

The metal member of an embodiment of the present invention can be used in, for example, sashes used in window frames. When having the same surface structure (including the physical structure and chemical properties) as that of the metal member of an embodiment of the present invention, an interior decoration material which has a microbicidal activity can be realized. Water drops can attach to sashes due to condensation. However, when the sashes have a microbicidal activity, occurrence of fungi due to the water drops can be suppressed.

The interior decoration materials, such as doorknobs and sashes, are preferably made of aluminum or stainless steel.

Figure 13:
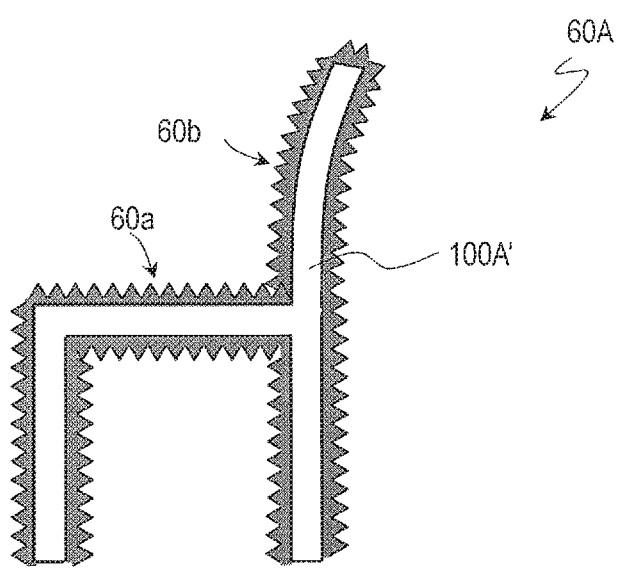
FIG. 13 A diagram schematically showing a chair 60A manufactured using an interior decoration material of an embodiment of the present invention.

The interior decoration material of the present embodiment can be used in, for example, a chair. FIG. 13 schematically shows a chair 60A manufactured using the interior decoration material of the present embodiment.

The chair 60A is manufactured using, for example, the metal member 100A'. The chair 60A includes a metal base 18Xr and a porous anodized layer 14 formed on the metal base 18Xr. The surface of the porous anodized layer 14 has a submicron-order uneven structure. The uneven structure includes a plurality of recessed portions 14Ap whose two-dimensional size viewed in the normal direction of the surface is more than 100 nm and less than 500 nm. The chair 60A may be entirely formed using the metal member 100A'. Alternatively, only part of the surface of the chair 60A (e.g., the seat surface 60a and the surface of the back 60b) may be formed using the metal member 100A'. The chair 60A is not limited to the metal member 100A' but may be formed using any of the above-described metal members of the embodiments of the present invention.

The shape of the chair 60A is not limited to the illustrated example but may be selected from a variety of known shapes. For example, the chair 60A may not have a back.

The chair 60A may be, for example, a chair used by many and unspecified persons. The chair 60A may be placed in public places (e.g., station or park). The chair 60A is not limited to indoor uses but may be placed outdoor.

Uses of the metal member of an embodiment of the present invention are not limited to the above-described embodiments. For example, the metal member can be used in housewares. For example, the metal member can be used in, for example, a food container lid. Alternatively, the metal member may be used in parts or tubes for use in electric cooking devices, which are made of aluminum or stainless steel. Examples of the electric cooking devices include a wide variety of devices, including electric kettles, coffee makers, etc. For example, in an electric kettle or coffee maker, the metal member may be used in a tube provided between a water container and a water inlet.

Figure 14:
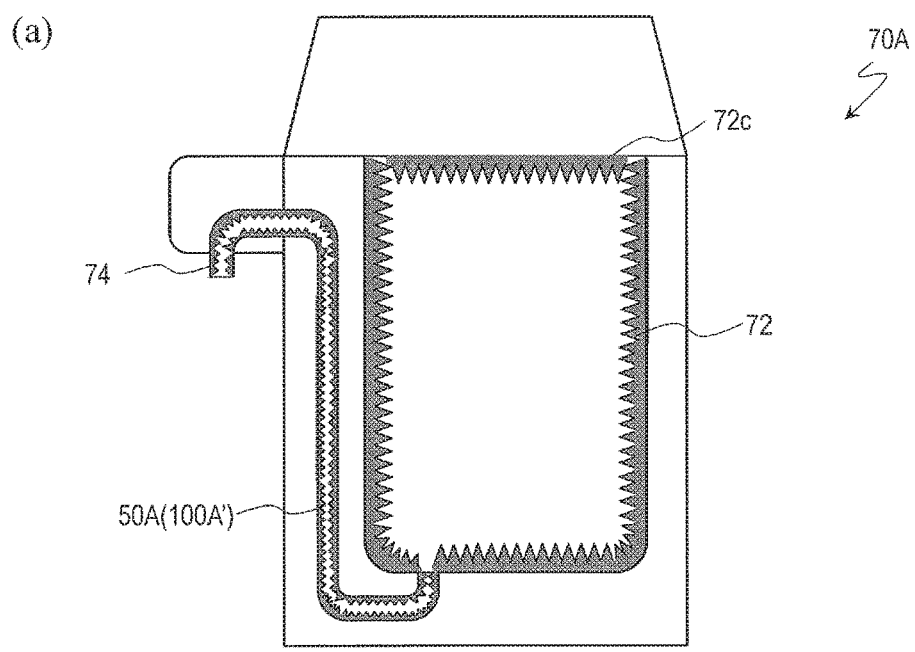
FIG. 14 (a) is a cross-sectional view schematically showing an electric water heater 70A of an embodiment of the present invention. (b) is a cross-sectional view schematically showing an electric water heater 70B of another embodiment of the present invention.
Figure 14:
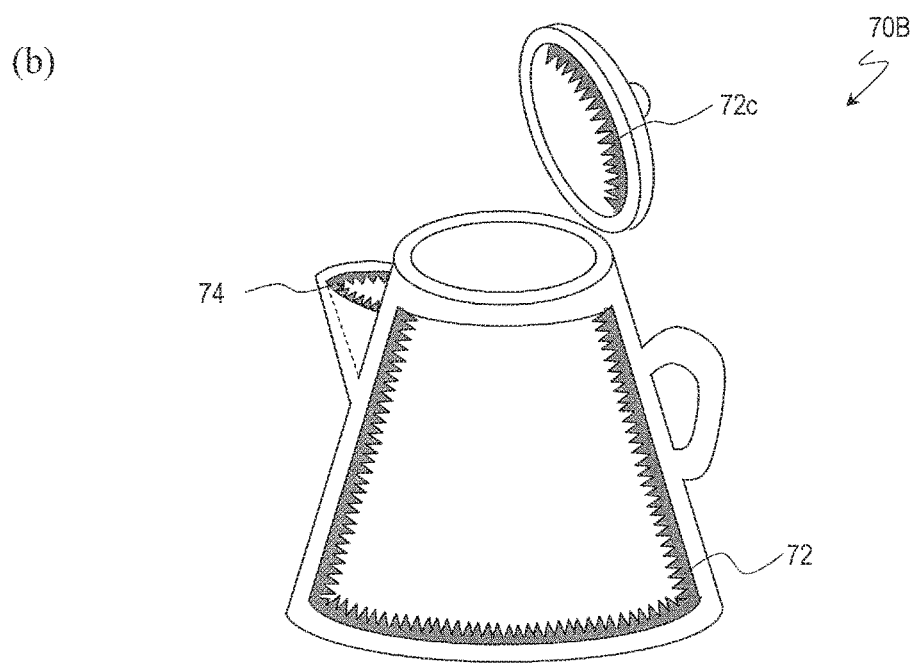

FIGS. 14(a) and 14(b) are cross-sectional views schematically showing electric water heaters (e.g., electric kettles) 70A and 70B of embodiments of the present invention.

As shown in FIG. 14(a), the electric water heater 70A includes a tank 72 for containing drinkable water and heating contained drinkable water, a spout 74 through which heated drinkable water is discharged, and a water elevating pipe 50A (100A') provided between the tank 72 and the spout 74. The water elevating pipe 50A is formed using, for example, the metal member 100A'. The water elevating pipe 50A includes a metal base 18Xr and a porous anodized layer 14 formed on the metal base 18Xr at the inside of the pipe. The surface of the porous anodized layer 14 has a submicron-order uneven structure. The uneven structure includes a plurality of recessed portions 14Ap whose two-dimensional size viewed in the normal direction of the surface is more than 100 nm and less than 500 nm. The inner surface of the water elevating pipe 50A has the same surface structure (including the physical structure and chemical properties) as that of the metal member 100A'. The water elevating pipe 50A is not limited to the metal member 100A' but may be formed using any of the above-described metal members of the embodiments of the present invention.

As shown in FIG. 14(a), the tank 72 and/or the spout 74 may also be formed using the metal member 100A'. That is, the tank 72 may include a metal base 18Xr and a porous anodized layer 14 formed on the metal base 18Xr at the inside of the tank. The inside of the tank 72 includes, for example, the inner lateral surface and inner bottom surface of the tank 72. The spout 74 may include a metal base 18Xr and a porous anodized layer 14 formed on the metal base 18Xr at the inside of the spout. The inside of the spout 74 refers to a surface which is to be in contact with drinkable water. Further, the lid 72c of the tank 72 may include a metal base 18Xr and a porous anodized layer 14 formed on the metal base 18Xr at the inside of the lid.

The shape of the electric water heater is not limited to the illustrated examples but may be selected from a variety of known shapes. For example, the electric water heater may not have a water elevating pipe, such as an electric water heater 70B shown in FIG. 14(b). The tank 72 and/or the spout 74 of the electric water heater 70B may be formed using the metal member 100A'.

The specific configuration of the electric water heater is well known and, therefore, the description thereof is herein omitted.

Figure 15:
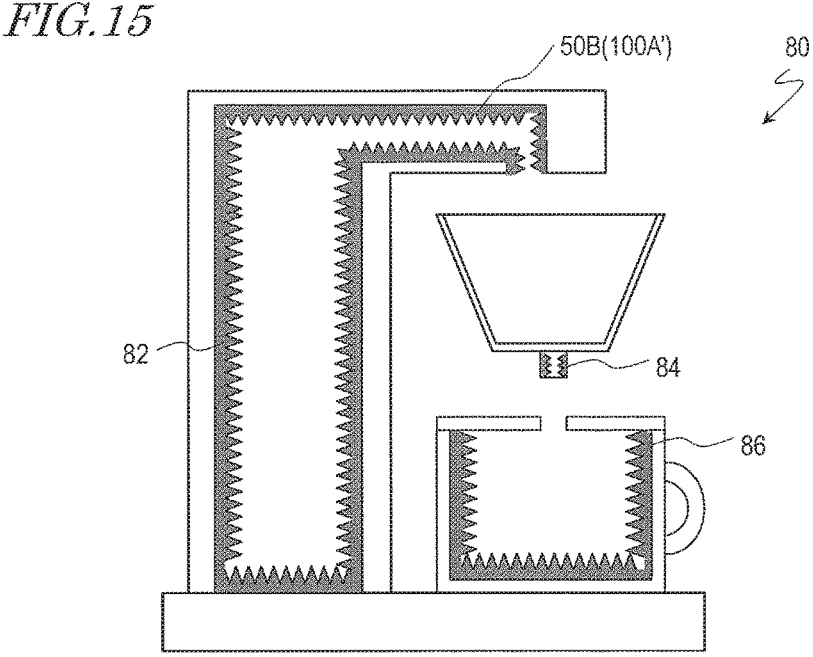
FIG. 15 A cross-sectional view schematically showing a beverage dispenser 80 of an embodiment of the present invent ion.

FIG. 15 is a cross-sectional view schematically showing a beverage dispenser (e.g., coffee maker) 80 of an embodiment of the present invention.

As shown in FIG. 15, the beverage dispenser 80 includes a tank 82 for containing drinkable water and heating contained drinkable water, a spout 84 through which a beverage including heated drinkable water is discharged, and a water supply pipe 50B (100A') provided between the tank 82 and the spout 84. The water supply pipe 50B is formed using, for example, the metal member 100A'. The water supply pipe 50B includes a metal base 18Xr and a porous anodized layer 14 formed on the metal base 18Xr at the inside of the pipe. The surface of the porous anodized layer 14 has a submicron-order uneven structure. The uneven structure includes a plurality of recessed portions 14Ap whose two-dimensional size viewed in the normal direction of the surface is more than 100 nm and less than 500 nm. The inner surface of the water supply pipe 50B has the same surface structure (including the physical structure and chemical properties) as that of the metal member 100A'. The water supply pipe 50B is not limited to the metal member 100A' but may be formed using any of the above-described metal members of the embodiments of the present invention.

As shown in FIG. 15, the tank 82 and/or the spout 84 may also be formed using the metal member 100A'. That is, the tank 82 may include a metal base 18Xr and a porous anodized layer 14 formed on the metal base 18Xr at the inside of the tank. The inside of the tank 82 includes, for example, the inner lateral surface and inner bottom surface of the tank 82. The spout 84 may include a metal base 18Xr and a porous anodized layer 14 formed on the metal base 18Xr at the inside of the spout. The inside of the spout 84 refers to a surface which is to be in contact with the beverage. The beverage dispenser 80 may further includes a beverage server 86 for receiving a beverage discharged through the spout 84. The beverage server 86 may be formed using the metal member 100A'. That is, the beverage server 86 may include a metal base 18Xr and a porous anodized layer 14 formed on the metal base 18Xr at the inside of the beverage server.

The shape of the beverage dispenser is not limited to the illustrated example but may be selected from a variety of known shapes. The specific configuration of the beverage dispenser is well known and, therefore, the description thereof is herein omitted.

Figure 16:
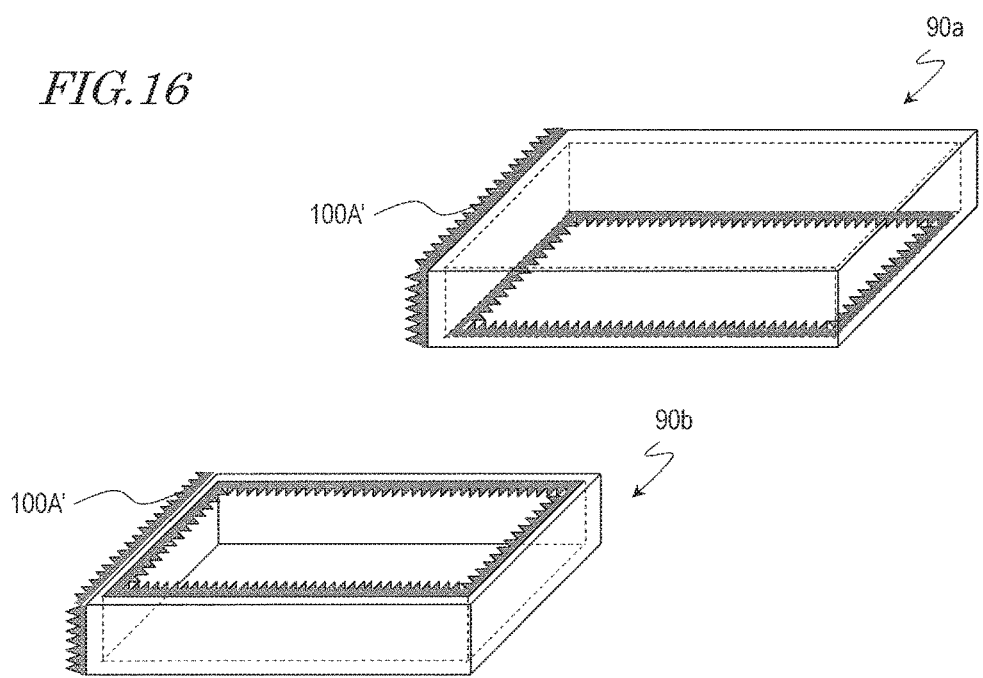
FIG. 16 A diagram schematically showing a food container 90a and a food container lid 90b of an embodiment of the present invention.

FIG. 16 is a diagram schematically showing a food container 90a and a food container lid 90b of an embodiment of the present invention.

As shown in FIG. 16, the food container 90a and the food container lid 90b are each formed using, for example, the metal member 100A'. The food container 90a and the food container lid 90b each include a metal base 18Xr and a porous anodized layer 14 formed on the metal base 18Xr. The surface of the porous anodized layer 14 has a submicron-order uneven structure. The uneven structure includes a plurality of recessed portions 14Ap whose two-dimensional size viewed in the normal direction of the surface is more than 100 nm and less than 500 nm. That is, the surfaces of the food container 90a and the food container lid 90b have the same surface structure (including the physical structure and chemical properties) as that of the metal member 100A'. The food container 90a and the food container lid 90b are each not limited to the metal member 100A' but may be formed using any of the above-described metal members of the embodiments of the present invention.

As shown in FIG. 16, the food container 90a and the food container lid 90b have the uneven structure at the outside and inside thereof. It is preferred that the food container 90a and the food container lid 90b have the uneven structure at least at the inside thereof. When the uneven structure is formed in the outer and inner surfaces through the same process (including the anodization step and the etching step), the uneven structure can be provided at the outside and the inside without increasing the manufacturing steps.

The shape of the food container 90a and the food container lid 90b is not limited to the illustrated examples but may be selected from a variety of known shapes.

INDUSTRIAL APPLICABILITY

A heat exchanger of an embodiment of the present invention which has a fin whose surface has a microbicidal activity is applicable to various uses including, for example, air conditioners, refrigerators, and freezers. A metal member of an embodiment of the present invention whose surface has a microbicidal activity is applicable to various uses including, for example, interior decoration materials and housewares.

REFERENCE SIGNS LIST 12, 18Xr metal base
14 porous anodized layer
14Ap, 14Bp recessed portion
15 protruding portion
50 fin
50A water elevating pipe
50B water supply pipe
70A, 70B electric water heater
72 tank
74 spout
80 beverage dispenser
82 tank
84 spout
90a food container
90b food container lid
100A, 100B, 100A', 100B' metal member
200A, 200B heat exchanger
210A, 210B heat dissipation unit

The invention claimed is:

1. A heat exchanger comprising a fin, the fin including a metal base and a porous anodized layer formed on the metal base, wherein
   a surface of the porous anodized layer has a submicron-order uneven structure, the uneven structure including a plurality of recessed portions whose two-dimensional size viewed in a normal direction of the surface is more than 100 nm and less than 500 nm;
   the surface is treated with a silane coupling agent which contains an amino group; and
   the surface has a microbicidal effect, wherein the uneven structure includes a protruding portion formed between adjoining ones of the plurality of recessed portions.

2. The heat exchanger of claim 1, wherein the protruding portion includes a ridge formed at an intersection of lateral surfaces of adjoining ones of the plurality of recessed portions.

3. The heat exchanger of claim 1, wherein an adjoining distance of the plurality of recessed portions is greater than the two-dimensional size of the plurality of recessed portions.

4. The heat exchanger of claim 1, wherein the lateral surfaces of the plurality of recessed portions are inclined with respect to a normal direction of the surface.

5. The heat exchanger of claim 1, wherein at least part of the lateral surfaces of the plurality of recessed portions is stepped.

6. The heat exchanger of claim 1, wherein a static contact angle of the surface with respect to hexadecane is not more than $110.4°$.

7. The heat exchanger of claim 1, wherein a static contact angle of the surface with respect to hexadecane is not more than $29.3°$.

8. The heat exchanger of claim 1, wherein an adjoining distance of the plurality of recessed portions is more than 100 nm and less than 500 nm.

9. The heat exchanger of claim 1, wherein the two-dimensional size of the plurality of recessed portions is not less than 140 nm.

10. The heat exchanger of claim 1, wherein the metal base is a valve metal.

11. A metal member comprising a metal base and a porous anodized layer formed on the metal base,
    wherein
    a surface of the porous anodized layer has a submicron-order uneven structure, the uneven structure including a plurality of recessed portions whose two-dimensional size viewed in a normal direction of the surface is more than 100 nm and less than 500 nm;
    the surface is treated with a silane coupling agent which contains an amino group; and
    the surface has a microbicidal effect, wherein the uneven structure includes a protruding portion formed between adjoining ones of the plurality of recessed portions.

12. The metal member of claim 11, wherein a static contact angle of the surface with respect to hexadecane is not more than $110.4°$.

13. The metal member of claim 11, wherein a static contact angle of the surface with respect to hexadecane is not more than $29.3°$.

14. A method for sterilizing a gas or liquid by bringing the gas or liquid into contact with a surface of a fin of a heat exchanger,
   wherein
   the heat exchanger comprises the fin, the fin including a metal base and a porous anodized layer formed on the metal base;
   a surface of the porous anodized layer has a submicron-order uneven structure, the uneven structure including a plurality of recessed portions whose two-dimensional size viewed in a normal direction of the surface is more than 100 nm and less than 500 nm;
   the surface of the porous anodized layer is treated with a silane coupling agent which contains an amino group; and
   the surface of the porous anodized layer has a microbicidal effect, wherein the uneven structure includes a protruding portion formed between adjoining ones of the plurality of recessed portions.

* * * * *